(12) United States Patent
Petelka

(10) Patent No.: US 11,912,115 B2
(45) Date of Patent: Feb. 27, 2024

(54) WHEEL IN CAR PLATE ASSEMBLIES AND USES THEREOF

(71) Applicant: Petelka Investments Inc., Puslinch (CA)

(72) Inventor: Brian W. Petelka, Puslinch (CA)

(73) Assignee: PETELKA INVESTMENTS INC., Ontario (CA)

( * ) Notice: Subject to any disclaimer, the term of this patent is extended or adjusted under 35 U.S.C. 154(b) by 360 days.

(21) Appl. No.: 17/308,966

(22) Filed: May 5, 2021

(65) Prior Publication Data
US 2021/0347393 A1 Nov. 11, 2021

Related U.S. Application Data

(60) Provisional application No. 63/020,258, filed on May 5, 2020.

(51) Int. Cl.
| | |
|---|---|
| *B60J 7/06* | (2006.01) |
| *B61F 5/14* | (2006.01) |
| *F16C 29/10* | (2006.01) |
| *B61D 39/00* | (2006.01) |
| *B60P 7/04* | (2006.01) |

(52) U.S. Cl.
CPC .............. *B60J 7/062* (2013.01); *B60J 7/068* (2013.01); *B61D 39/002* (2013.01); *B61F 5/14* (2013.01); *F16C 29/10* (2013.01); *B60P 7/04* (2013.01)

(58) Field of Classification Search
CPC ...... B61F 5/00; B61F 5/02; B61F 5/14; B61F 5/148; B60J 5/062; B60J 5/065; B60J 7/062; B60J 7/065; B60J 7/067; B60J 7/068; F16C 29/045; F16C 29/10; B60P 7/02; B60P 7/04; B61D 39/002; B61D 39/006
See application file for complete search history.

(56) References Cited

U.S. PATENT DOCUMENTS

| | | | | |
|---|---|---|---|---|
| 4,737,058 | A | * | 4/1988 | Callman ................. B60B 35/18 411/197 |
| 4,943,110 | A | * | 7/1990 | Pastva ...................... B60J 5/065 49/411 |
| 5,924,759 | A | * | 7/1999 | DeMonte ................. B60J 7/062 296/105 |

(Continued)

FOREIGN PATENT DOCUMENTS

| | | | | |
|---|---|---|---|---|
| FR | 2552378 | A1 * | 3/1985 | ................. B60J 7/10 |
| WO | WO-2016015699 | A1 * | 2/2016 | ............. F16C 13/006 |

*Primary Examiner* — S. Joseph Morano
*Assistant Examiner* — Cheng Lin
(74) *Attorney, Agent, or Firm* — Jonathan Kidney; Intelink Law Group, P.C.

(57) ABSTRACT

A convertible wheel is described that is interchangeably used with at least two different car plate designs and tracks. In particular, there is provided a wheel for use with a bearing and a car plate in a tarpaulin system. The wheel comprises a cylindrical body with a groove, first face, an opposed second face, and a central cavity positioned therebetween for receiving the bearing therein. The first face has a first opening with a first diameter, and the second face has a second opening with a second diameter that is smaller than the first diameter. Either the first face or the second face can be positioned facing the car plate.

20 Claims, 25 Drawing Sheets

(56) References Cited

U.S. PATENT DOCUMENTS

| | | | | |
|---|---|---|---|---|
| 6,481,779 | B1* | 11/2002 | Gothier | B60J 7/062 |
| | | | | 296/105 |
| 9,033,393 | B2* | 5/2015 | Damsi | B60J 7/022 |
| | | | | 296/100.18 |
| 10,549,794 | B2* | 2/2020 | Petelka | B62D 33/0222 |
| 2014/0197659 | A1* | 7/2014 | Petelka | B60J 5/065 |
| | | | | 296/100.15 |

* cited by examiner

WHEEL IN CAR PLATE ASSEMBLIES AND USES THEREOF

CROSS-REFERENCE TO RELATED APPLICATION(S)

This application claims the benefit of U.S. Provisional Patent Application No. 63/020,258, filed May 5, 2020, the contents of which are hereby incorporated by reference in its entirety.

FIELD

This invention relates to a wheel in a wheel assembly and, more particularly to a dual use of the wheel in multiple wheel assemblies.

BACKGROUND

Trucks having trailers with flat beds, which are well known in the transportation industry, are commonly used for shipping goods, either locally, regionally or internationally. In order to protect goods loaded on the flat bed from exposure to the elements, vandalism or theft, the goods are typically covered with tarpaulins, or tarps.

Typically, the flat bed can be uncovered by sliding the car at the back of the flat bed towards the front, causing it and the other cars to gather at the front of the flat bed and the tarp to retract, exposing the flat bed. The flat bed can be re-covered by sliding the rear car toward the back of the flat bed again, causing the remaining cars to return to their original spaced apart positions and the tarp to unfurl, covering the flat bed. The tarpaulin will typically be attached to bow lift assemblies that are in turn attached to tracks via car plates to allow for the travel along the length of the flat bed.

Each car plate includes one or more rollers or wheels, which engages the tracks such that the bow lift assemblies and tarpaulin may slide along the track. Typically, such wheel assemblies involve a v-groove wheel that is rotatably secured to the car plate with a bolt and nut. An example of such a bow lift assembly may be found in U.S. Pat. No. 9,333,991.

However, different car plates often require wheel assemblies with different wheel geometries and/or different wheel configurations in order to be properly secure thereto. As well, due to the number of moving parts, it may be a challenge to make the wheel assemblies easy to use, strong, and compact at the same time. Thus, an improvement over the above noted wheel, car plate, and bow lift assemblies is desirable.

SUMMARY

Disclosed herein is a wheel for use with a bearing and a car plate in a tarpaulin system, the wheel comprising: a cylindrical body with a groove, a first face, an opposed second face, and a central cavity positioned therebetween for receiving the bearing therein; the first face having a first opening with a first diameter; and the second face having a second opening with a second diameter that is smaller than the first diameter; wherein either the first face or the second face can be positioned facing the car plate.

There is also disclosed herein is a wheel assembly comprising: the wheel described above, a bearing concentrically situated within the central cavity of the cylindrical body; a hub with a hub head and a hub shank concentrically positioned and situated through the first opening of the wheel and through the bearing, the hub head being positioned proximate the first face; and a locking ring secured to a distal end of the hub to secure the hub in place within the cylindrical body and the bearing.

There is further disclosed herein a car plate assembly comprising: a car plate with a wheel aperture; the wheel assembly described above, wherein the first face is orientated facing the car plate; an pin situated through the wheel aperture and the hub of the wheel assembly; wherein the hub head also acts as a spacer between the car plate and the first face of the wheel.

Disclosed herein is another wheel assembly comprising the wheel described above, a bearing concentrically situated within the central cavity of the cylindrical body; a spacer positioned proximate the second face of the wheel; a bolt with a bolt head and a bolt shank threaded through the spacer, the second opening of the wheel, and the bearing, wherein the bolt head is positioned proximate the second face; and a nut secured to a distal end of the bolt to secure the bolt in place within the cylindrical body and the bearing.

There is further disclosed herein another car plate assembly comprising: a car plate with a wheel aperture; the wheel assembly described above wherein the second face is orientated facing the car plate; the bolt shank being situated through the wheel aperture, the spacer, and the bearing of the wheel assembly; wherein the spacer is situated between the car plate and the second face of the wheel.

In another embodiment, there is disclosed a use of a wheel with a bearing with a car plate, the wheel comprising: a cylindrical body with a groove, first face, an opposed second face, and a central cavity positioned therebetween for receiving the bearing therein; the first face having a first opening with a first diameter; and the second face having a second opening with a second diameter that is smaller than the first diameter; wherein either the first face or the second face can be positioned facing the car plate.

In a further embedment, there is disclosed a car plate assembly comprising: a car plate with a first wheel aperture and a second wheel aperture positioned below, and spaced apart from, the first wheel aperture; a first wheel as described above; a first axle situated through the first wheel aperture and the first wheel to rotationally secure the first wheel to the car plate as an upper roller; a second wheel as described above; and a second axle situated through the second wheel aperture and the second wheel to rotationally secure the second wheel to the car plate below the first wheel as a lower roller; the upper and lower rollers spaced apart to operatively receive a track therebetween.

In a further embodiment, the car plate assembly comprises 2 upper wheels and 2 lower wheels. The upper and lower wheels engaging with a diamond shaped track therebetween.

Directional references herein such as "front", "rear", "upper", "lower", "horizontal", "vertical", "top", "bottom", "side" and the like are used purely for convenience of description and do not limit the scope of the present disclosure. Furthermore, any dimensions provided herein are presented merely by way of an example and unless otherwise specified do not limit the scope of the disclosure. Furthermore, geometric terms such as "straight", "flat", "curved", "point" and the like are not intended to limit the disclosure to any specific level of geometric precision, but should instead be understood in the context of the disclosure, taking into account normal manufacturing tolerances, as well as functional requirements as understood by a person skilled in the art.

BRIEF DESCRIPTION OF THE DRAWINGS

Reference will now be made, by way of example, to the accompanying drawings which show example embodiments of the present application.

Similar reference numerals may have been used in different figures to denote similar components.

Figure 1:
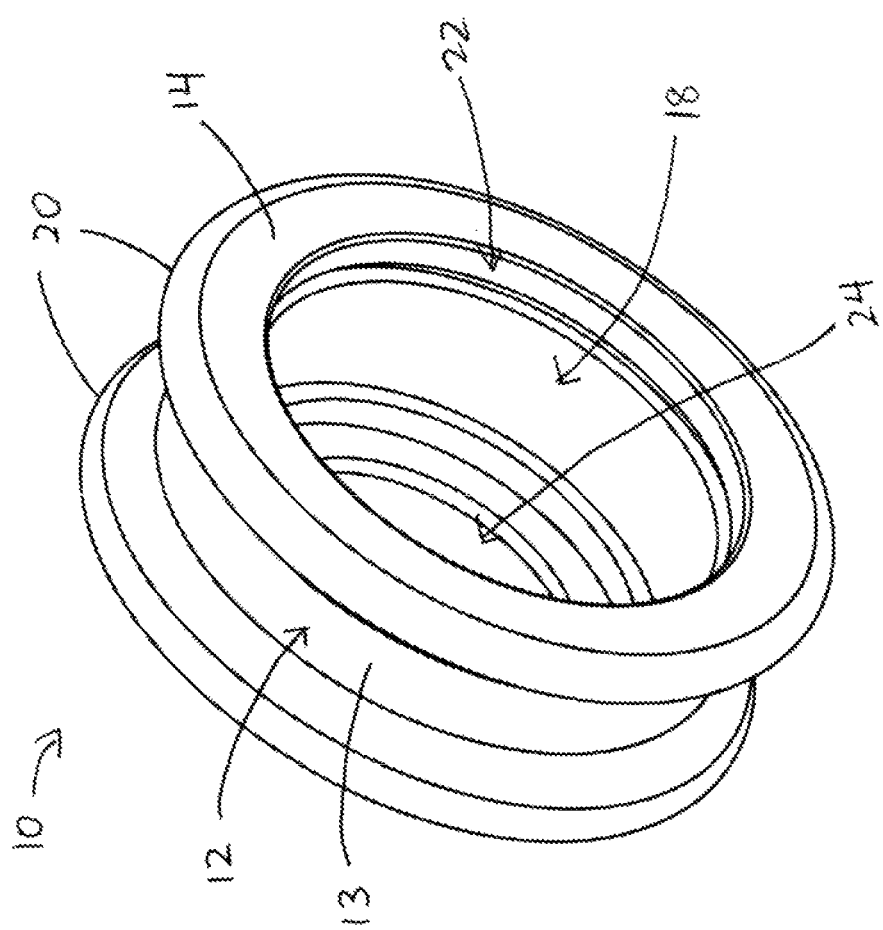
FIG. 1 is a rear perspective view of a wheel according an example embodiment of the present invention.
Figure 3:
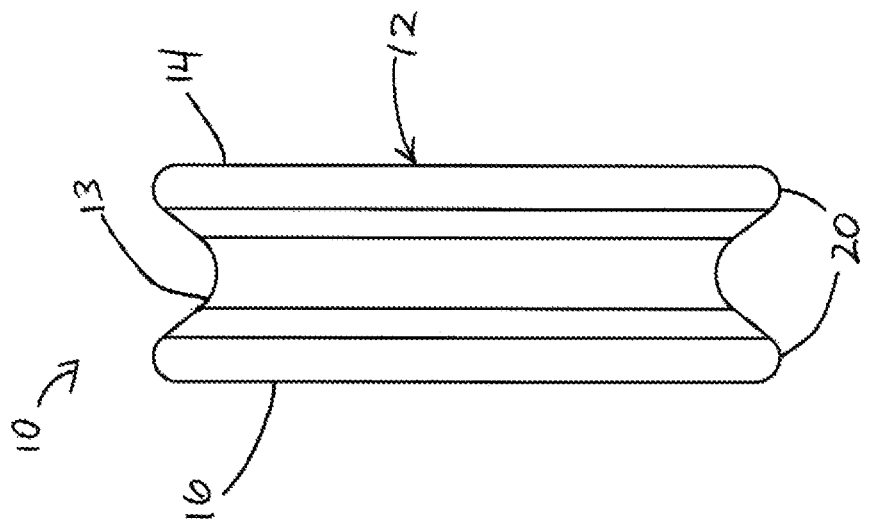
FIG. 3 is a side elevational view of the wheel according to FIG. 1.
Figure 2:
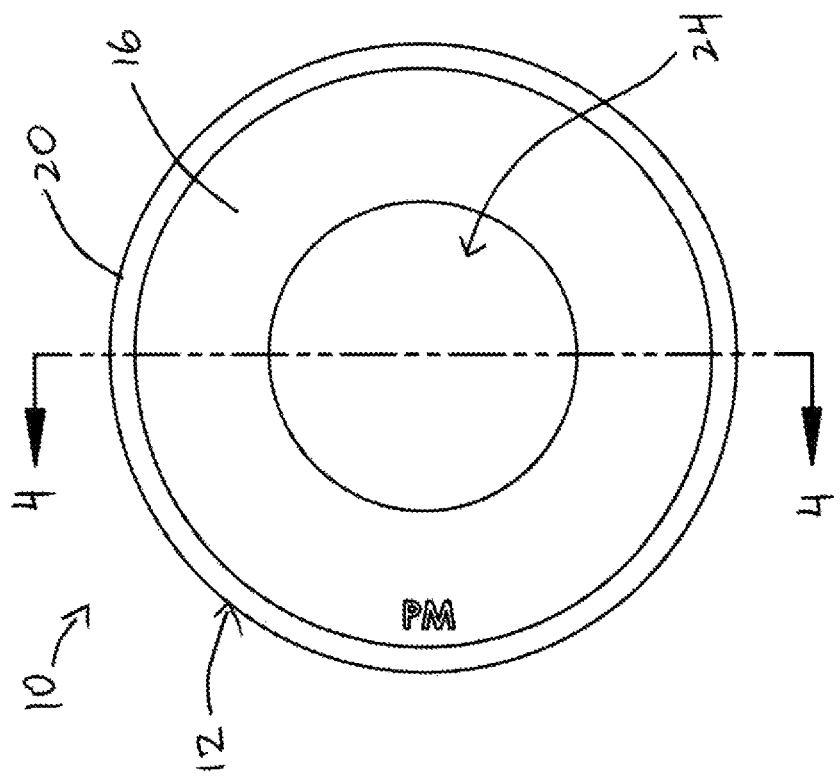
FIG. 2 is a front elevational view of the wheel according to FIG. 1.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention.

DETAILED DESCRIPTION OF EXAMPLE EMBODIMENTS

The present invention relates to a convertible wheel that is interchangeably used with at multiple different car plate designs and tracks. Example embodiments of the wheel, wheel assembly, and dual uses thereof of the present invention will now be described with reference to the attached figures.

Referring to FIGS. 1 to 5, there is shown a wheel 10 of the present invention. Wheel 10 generally includes a cylindrical body 12 with a rounded groove 13, first face 14, an opposed second face 16, and a central cavity 18. Cylindrical body 12 may have a generally cylindrical configuration with outer rails 20, between which rounded groove 13 is situated. Such a geometry may be considered a sheave configuration. In the depicted embodiment, groove 13 is rounded with an angle θ of about 76 degrees between outer rails 20. In alternate applications, groove 13 may have an angle between 70 and 80 degrees between outer rails 20.

First face 14 has a first opening 22 with a first diameter. Second face 16 has a second opening 24 with a second diameter that is smaller than the first diameter, and that is positioned concentrically with first opening 22. In some applications, the ratio of the first diameter of first opening 22 to the second diameter of second opening 24 may be between 4:3 to 5:3, and may preferably be around 7:5. In the shown embodiment, cylindrical body 12 has an overall diameter of around 2.89 inches and a width of around 1 inch. In such a case, the first diameter of first opening 22 may be between 2 inches and 2.2 inches, preferably between 2.052 and 2.068 inches, and is preferably 2.06 inches. The second diameter of second opening 24 may be between 1.3 inches and 1.5 inches, preferably between 1.4198 and 1.4248 inches and is preferably 1.4223 inches.

Figure 5:
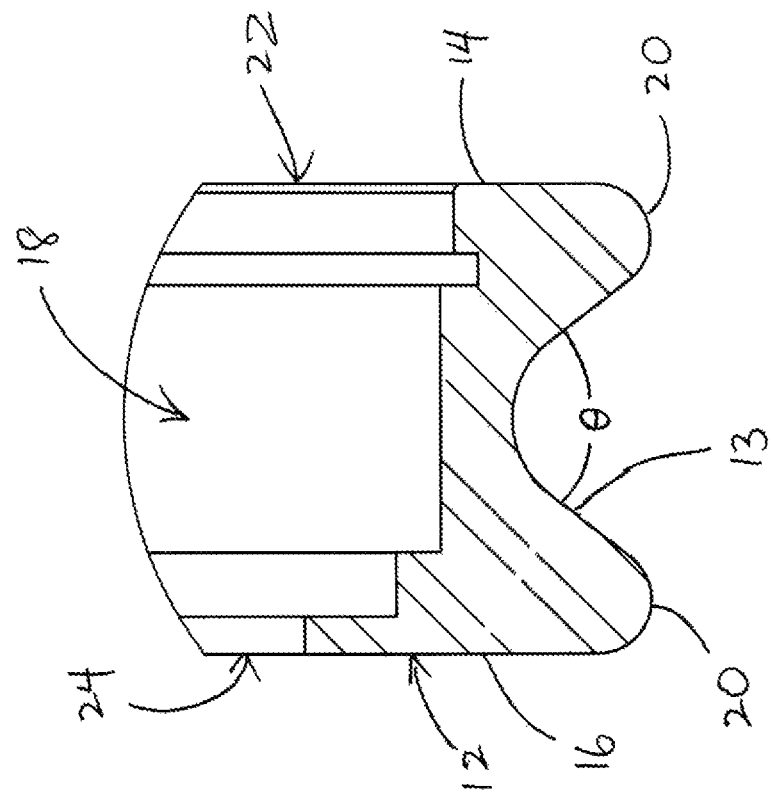
FIG. 5 is an enlarged view of portion A of FIG. 4.
Figure 4:
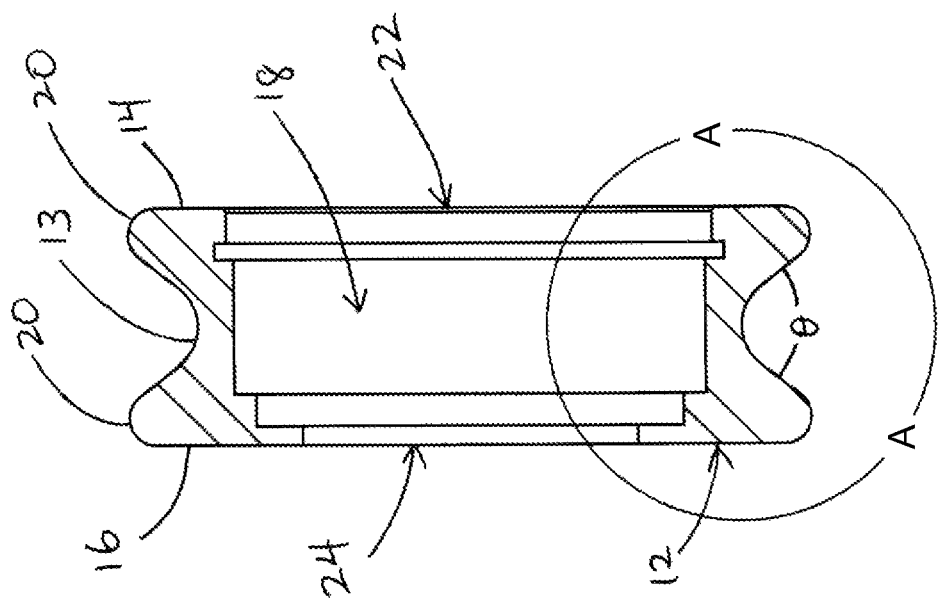
FIG. 4 is a cross-sectional view along line 4-4 of FIG. 2.

Central cavity 18 is situated in cylindrical body 12 between first face 14 and second face 16, and is dimensioned to receive a bearing therein. Central cavity 18 may be a cylindrical cavity or a V-groove cavity. As seen in FIGS. 4 and 5, central cavity 18 may also comprise sections which are specifically dimensioned to receive particular components in a wheel assembly.

One novel aspect of the present wheel is that it can be used with either the first face or the second face positioned facing different car plates in multiple, different wheel assemblies.

Figure 7:
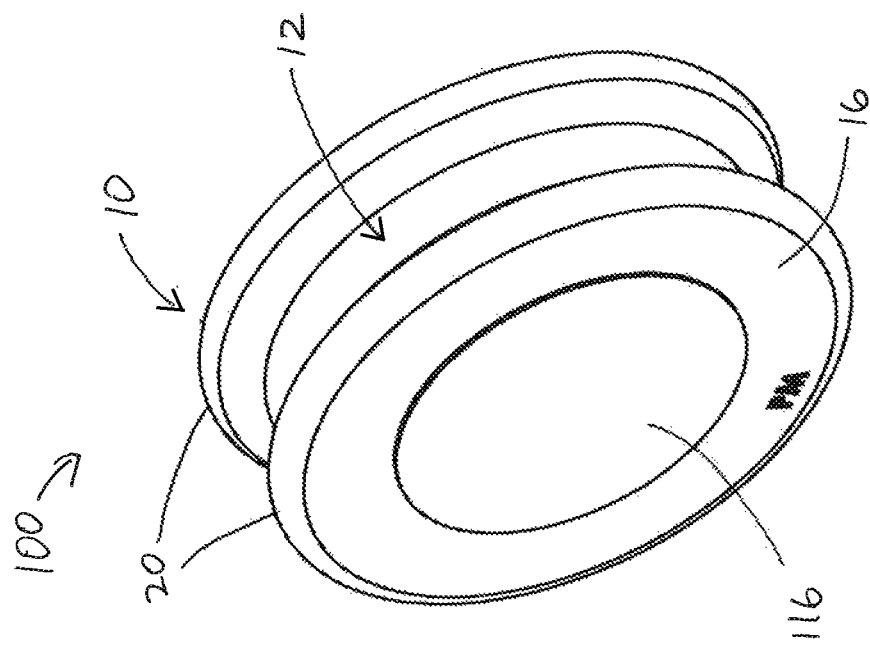
FIG. 7 is a front perspective view of the wheel assembly according to FIG. 6.
Figure 6:
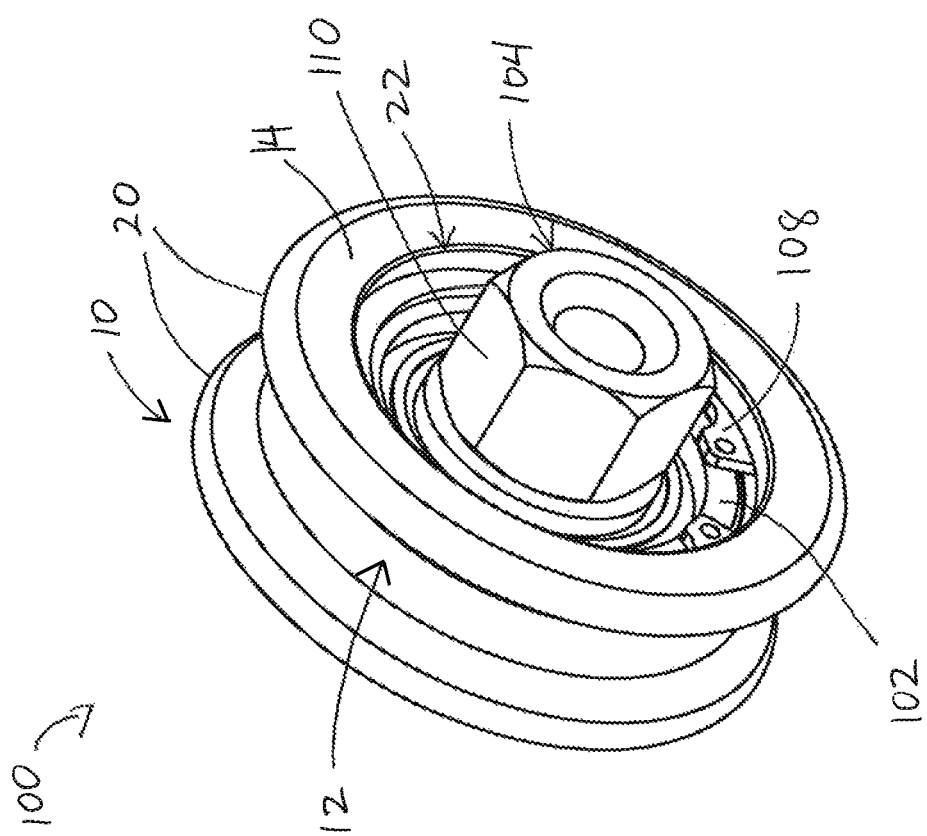
FIG. 6 is a rear perspective view of a wheel assembly with the wheel of FIG. 1 according an example embodiment of the present invention.
Figure 8:
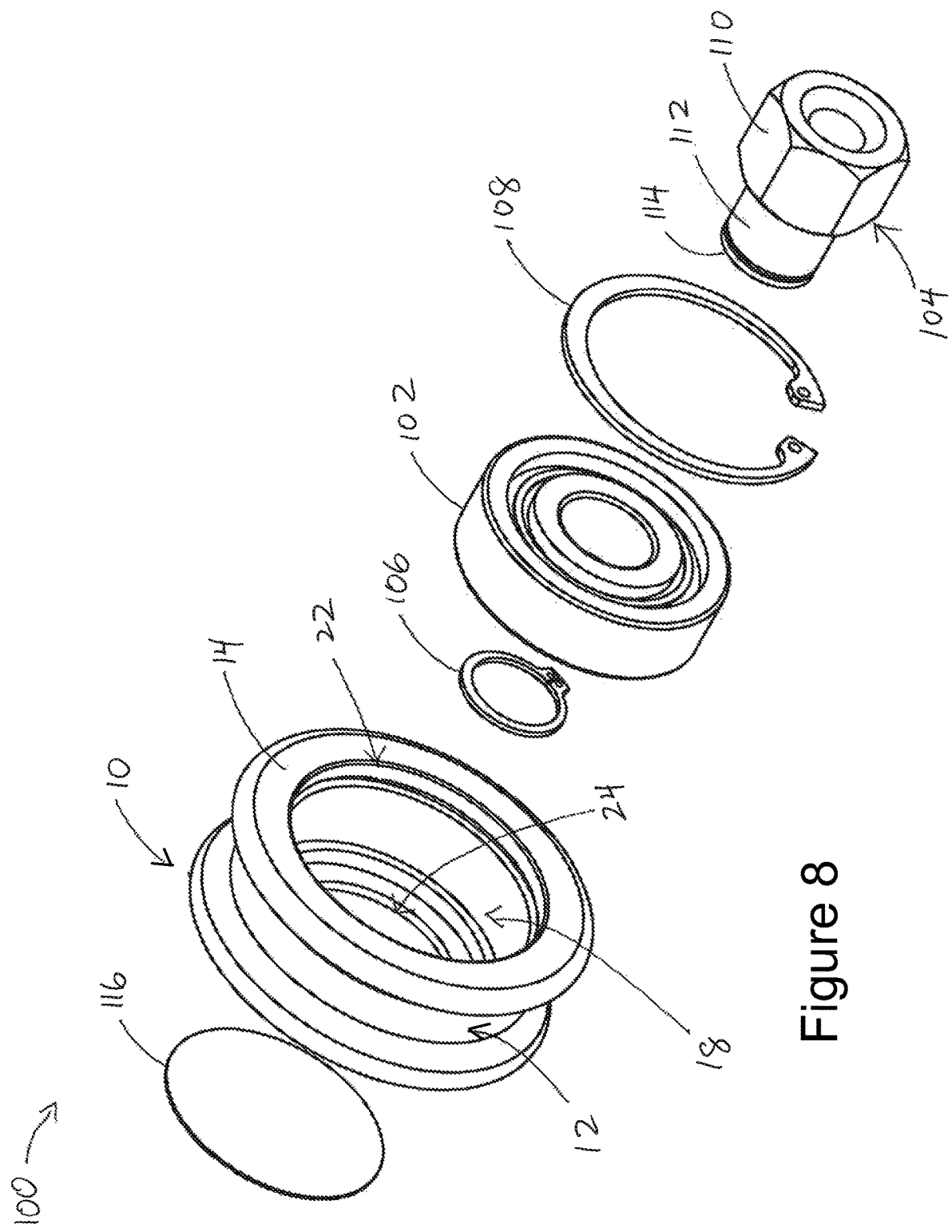
FIG. 8 is an exploded view of the wheel assembly according to FIG. 6.
Figure 10:
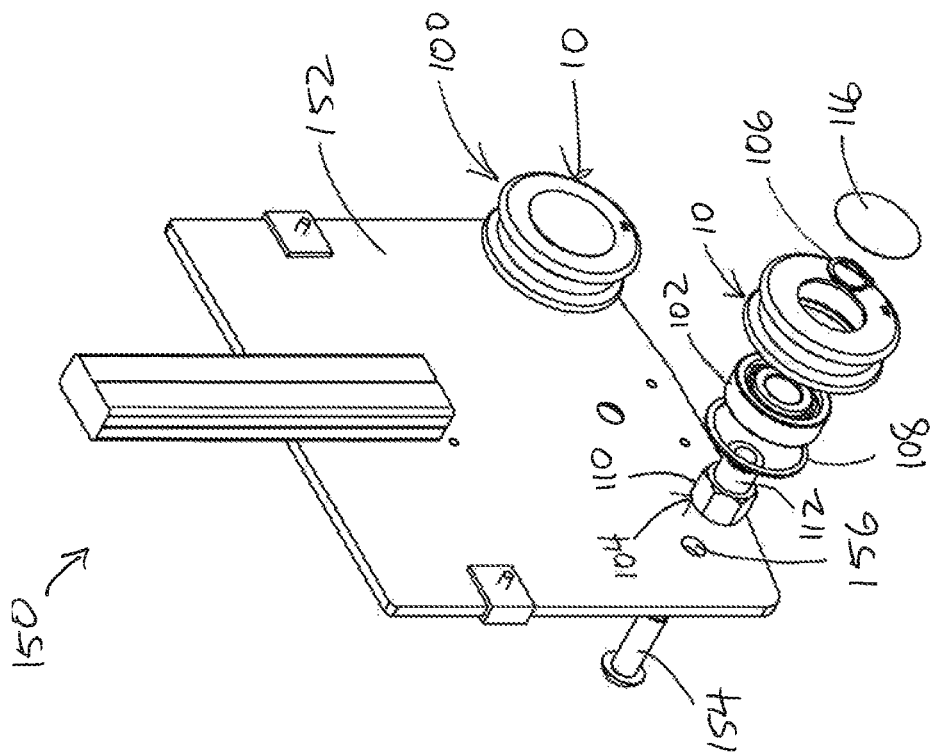
FIG. 10 is a partially exploded front perspective view of the wheel assembly according to FIG. 9.
Figure 9:
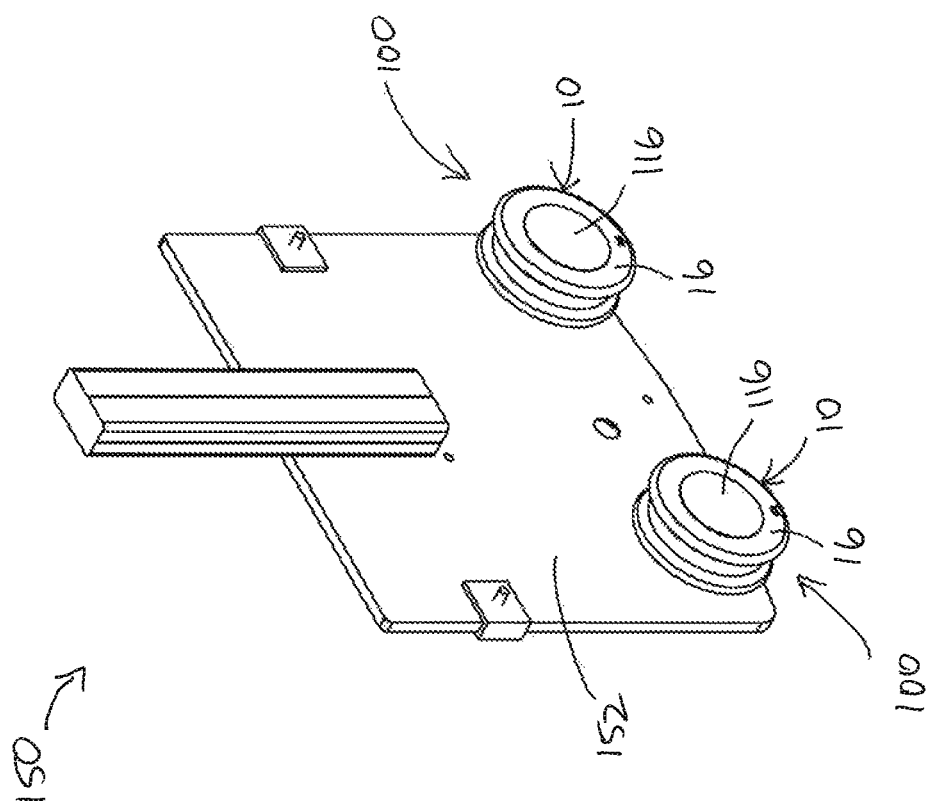
FIG. 9 is a front perspective view of the wheel assembly according to FIG. 7 in use with a car plate.
Figure 12:
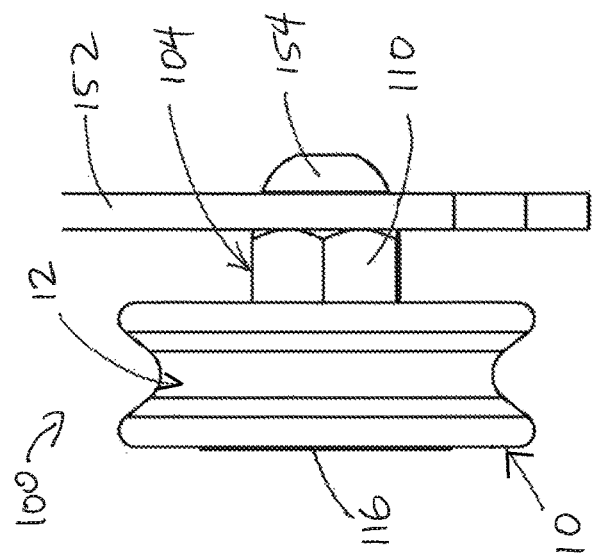
FIG. 12 is an enlarged view of portion B of FIG. 11.
Figure 11:
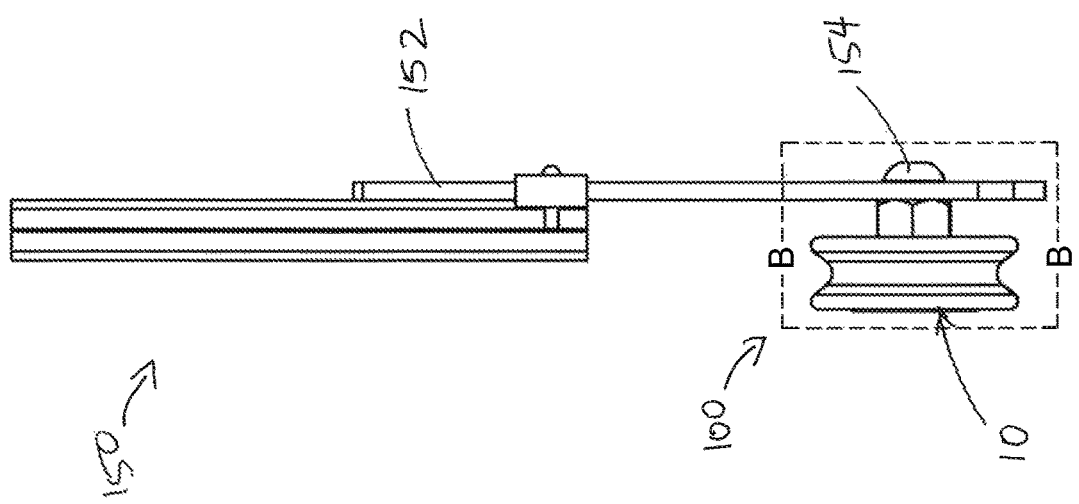
FIG. 11 is an elevational side view of the wheel assembly and car plate according to FIG. 9.

Referring to FIGS. 6 to 8, there is shown wheel 10 in use in a first wheel assembly 100. First wheel assembly 100 includes wheel 10 as described above, a bearing 102, a hub 104, and a locking ring 106.

Bearing 102 may be a number of wheel bearings as known in the art, such as a set of steel balls held together by a metal ring. A bearing helps wheel 10 spin quickly with as little friction as possible. Bearing 102 is concentrically situated within central cavity 18 of cylindrical body 12, and is often used with a bearing clip 108, which is also concentrically situated within central cavity 18. For example, looking to FIG. 4, bearing 102 may be positioned in the wide, central section of central cavity 18. Bearing clip 108 may be positioned in the adjacent, diametrically larger and thinner, section of central cavity 18, thus, physically helping to hold bearing 102 within central cavity 18.

Hub 104 generally includes a hub head 110 and a hub shank 112 that is concentrically positioned and situated through first opening 22 of wheel 10 and through bearing 102. In this manner, hub head 110 is positioned proximate first face 14 of wheel 10.

As hub shank 112 extends through bearing 102 to a distal end 114, distal end 114 of hub 104 terminates proximate second face 16 of wheel 10. In the embodiment depicted in the figures, distal end 114 of hub shank 112 terminates within central cavity 18 of cylindrical body 12.

First wheel assembly 100 includes locking ring 106 secured to distal end 114 of hub 104. Locking ring 106 secures hub 104 in place within cylindrical body 12 and bearing 102.

As shown, first wheel assembly 100 may further include a cover 116. Cover 116 may be secured to second face 16 in covering relation over second opening 24. For example, cover 116 may be a self adhesive cover.

Referring to FIGS. 9 to 12, there is shown first wheel assembly 100 in use in a first car plate assembly 150. First car plate assembly 150 includes a first car plate 152, a first wheel assembly 100 as described above, and a pin 154.

In the depicted embodiment, first car plate 152 has a wheel aperture, shown as a round aperture 156. First wheel assembly 100 is positioned relative to first car plate 152 such that first face 14 is orientated facing first car plate 152 and hub head 110 is abutting first car plate 152.

To secure first wheel assembly 100 to first car plate 152, pin 154 is situated through wheel aperture 156 and through hub 104 of first wheel assembly 100. As shown, pin 154 has a distal end 156, which terminates proximate second face 16 of wheel 10. In particular, distal end 156 is shown to terminate within central cavity 18. In this manner, cover 116 overlays and protects bearing 102, hub 104, and pin 154 from external elements, such as the weather.

Since hub head 110 abuts first car plate 152, hub head 110 also acts as a spacer between first car plate 152 and first face 14 of wheel 10. In this manner, hub 104 is situated and positioned internally within first wheel assembly 100, thus, no nut is required.

Figure 14:
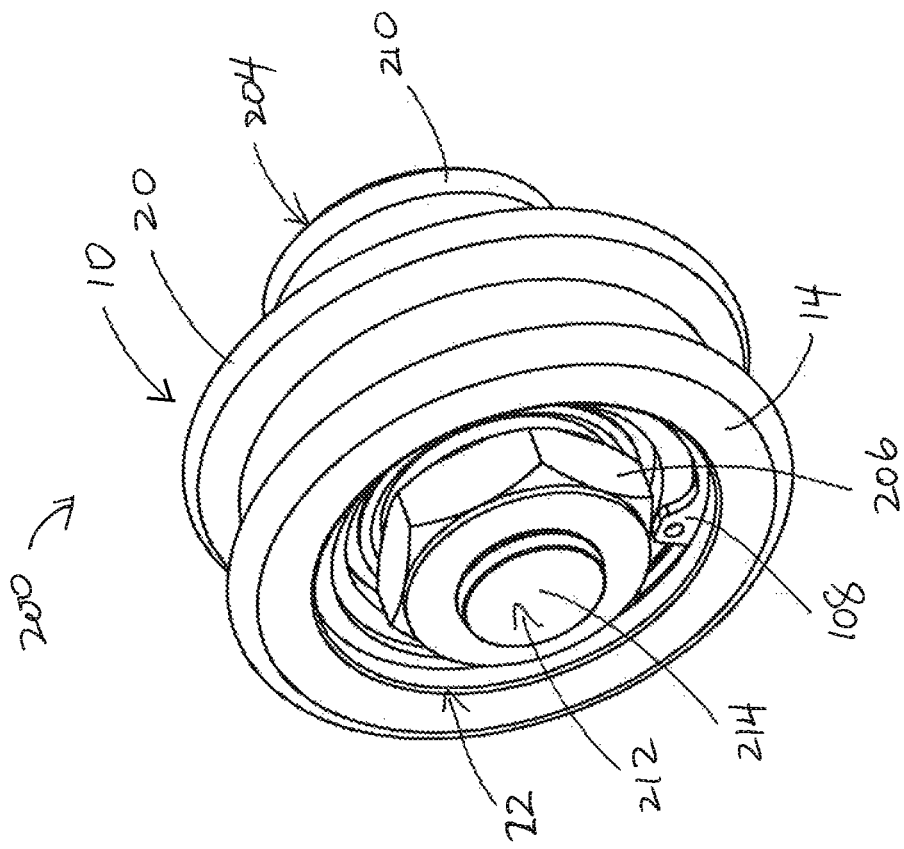
FIG. 14 is a front perspective view of the wheel assembly according to FIG. 13.
Figure 13:
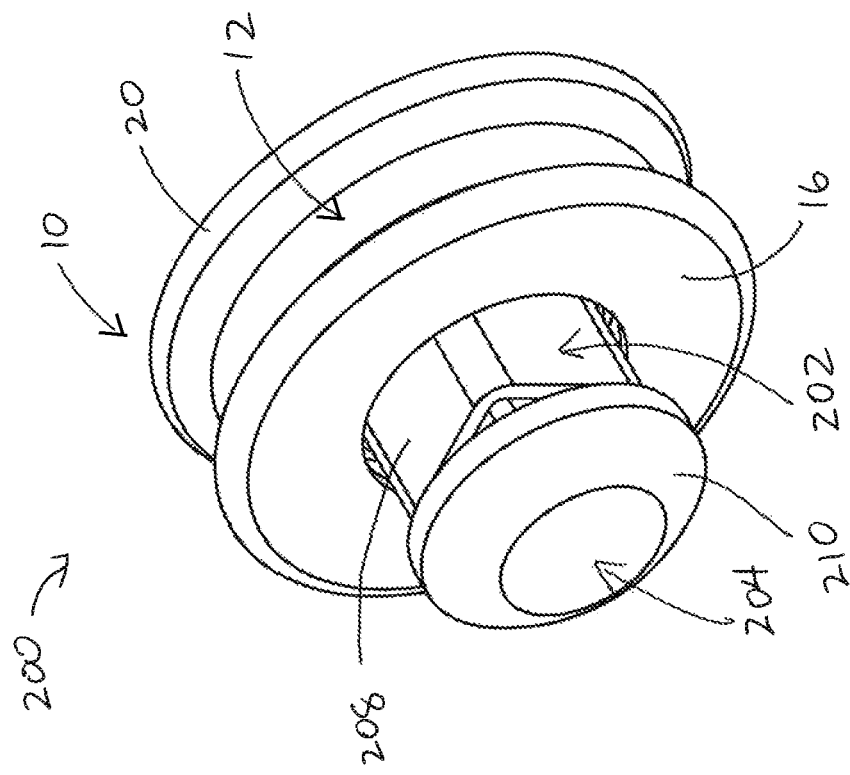
FIG. 13 is a rear perspective view of another wheel assembly with the wheel of FIG. 1 according another example embodiment of the present invention.
Figure 15:
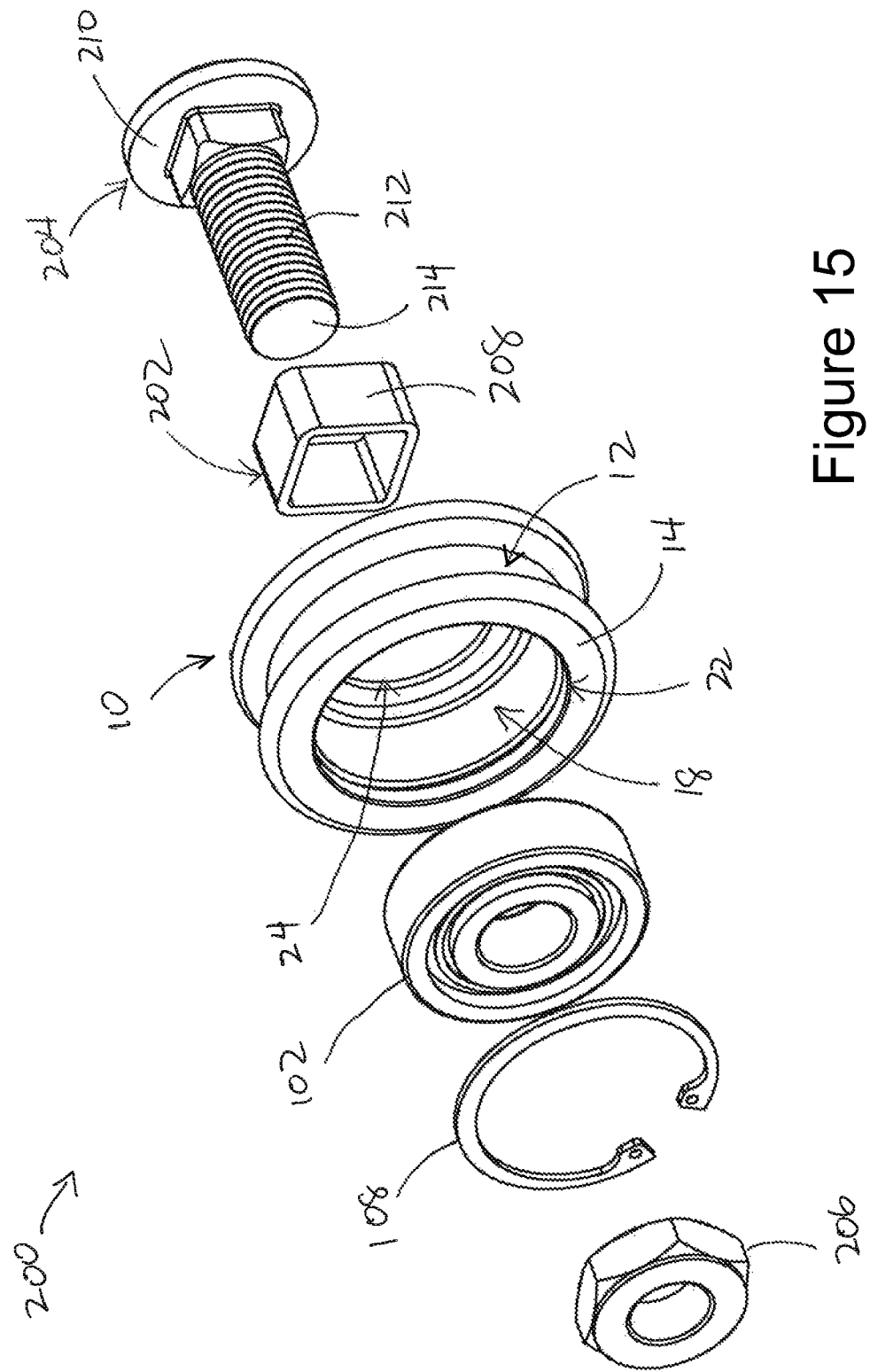
FIG. 15 is an exploded view of the wheel assembly according to FIG. 14.
Figure 17:
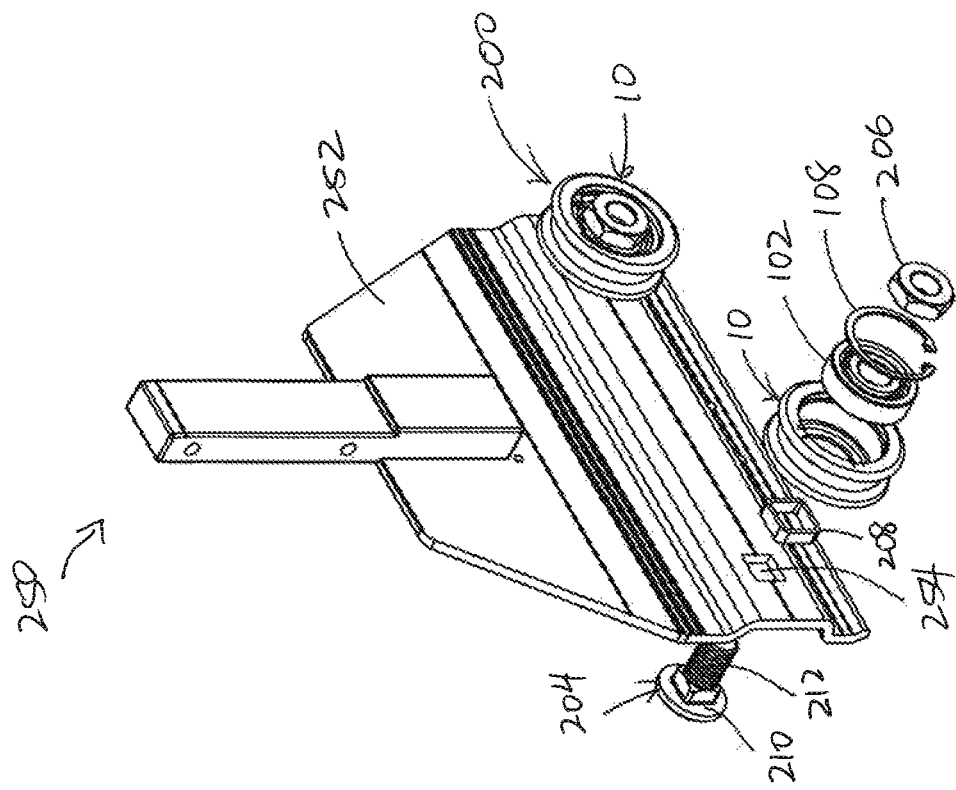
FIG. 17 is a partially exploded front perspective view of the wheel assembly according to FIG. 16.
Figure 16:
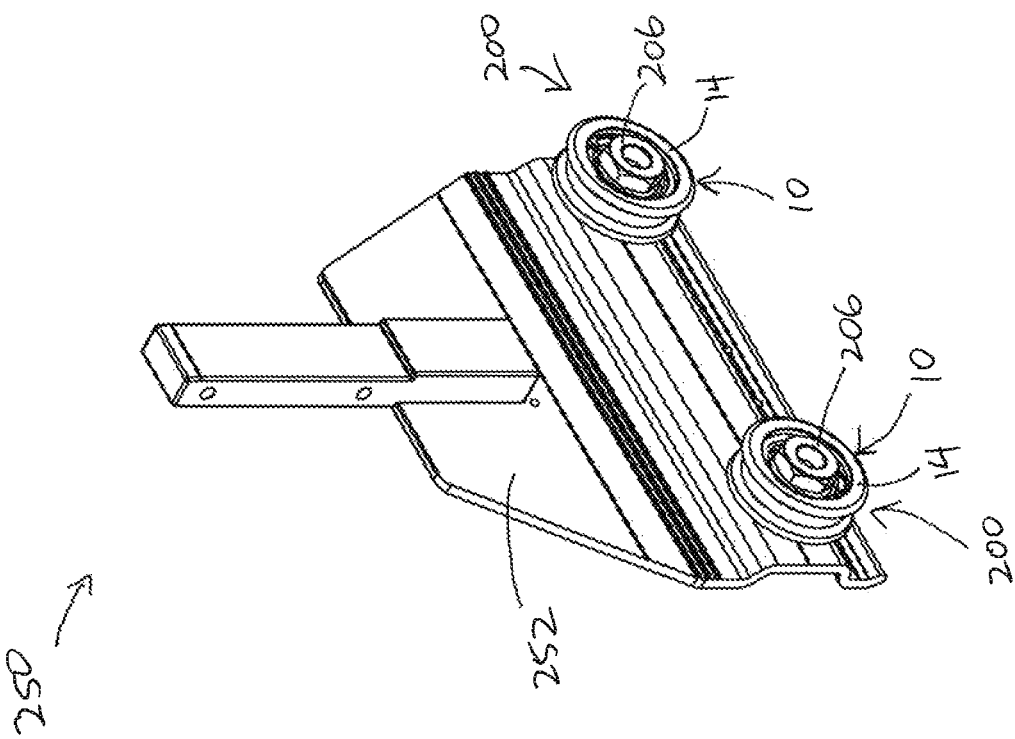
FIG. 16 is a front perspective view of the wheel assembly according to FIG. 14 in use with another car plate.
Figure 19:
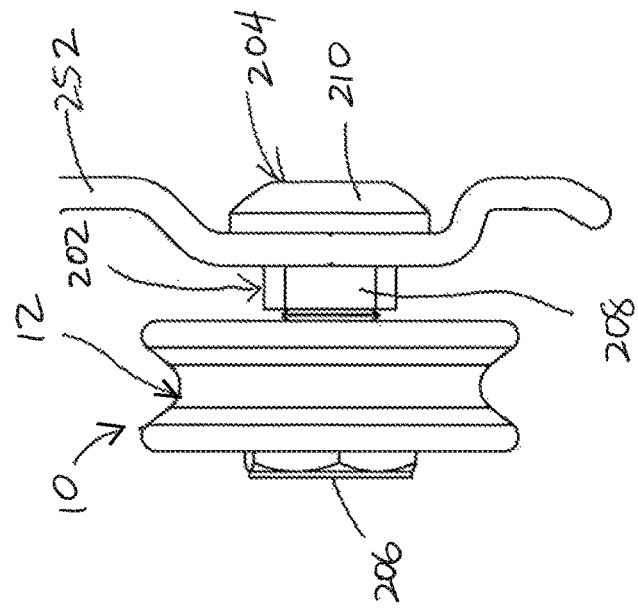
FIG. 19 is an enlarged view of portion C of FIG. 18.
Figure 18:
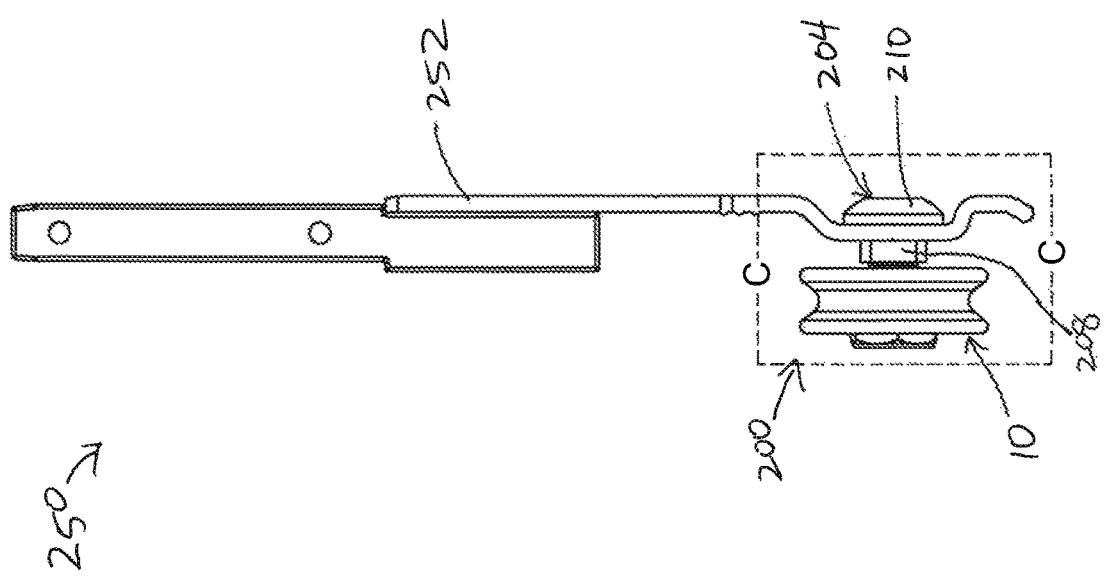
FIG. 18 is an elevational side view of the wheel assembly and car plate according to FIG. 16.
Figure 20:
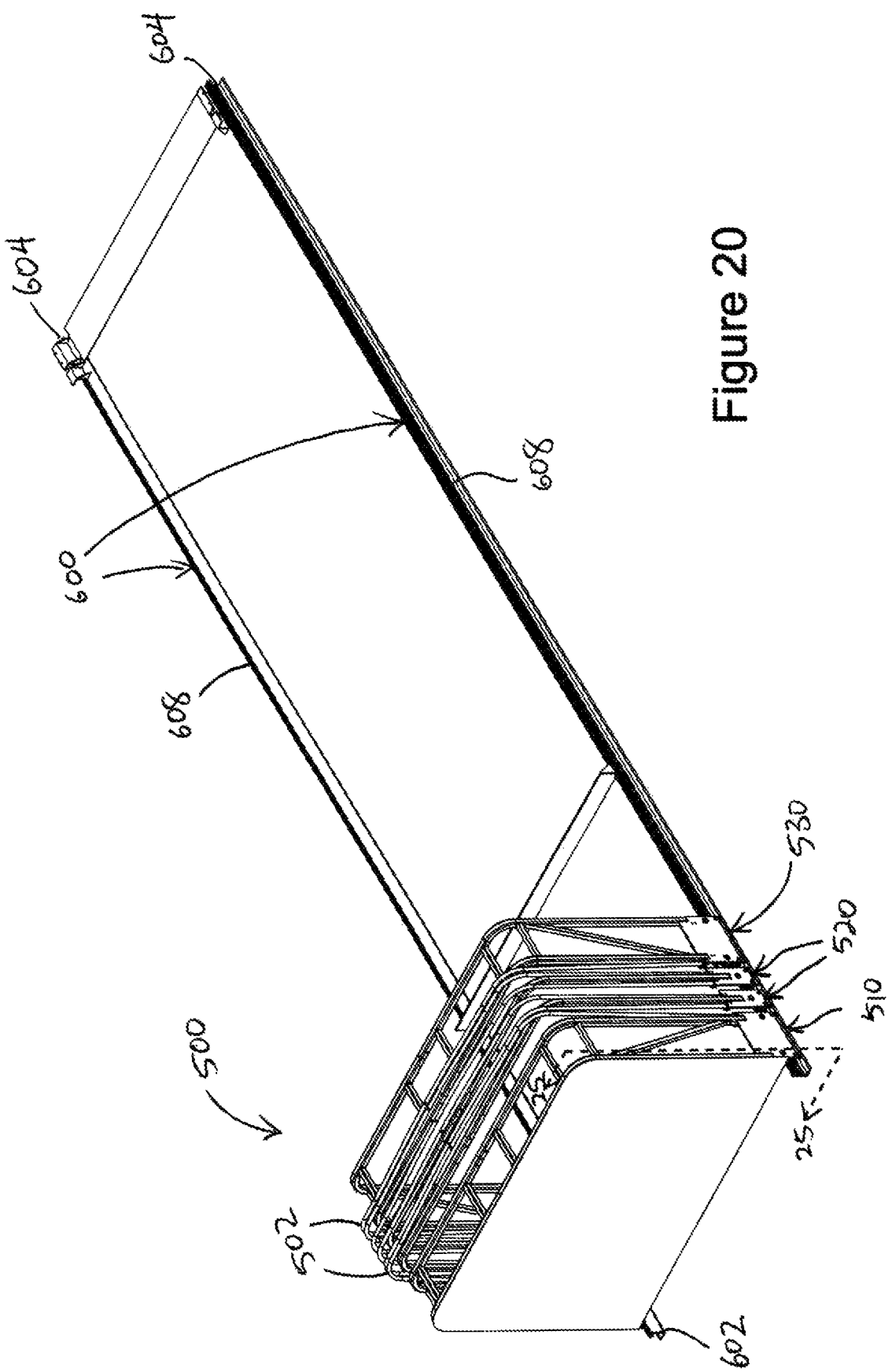
FIG. 20 is a front perspective view of a bow lift assembly having car plate assemblies with the wheel of FIG. 1 and a set of tracks according other example embodiments of the present invention.
Figure 21:
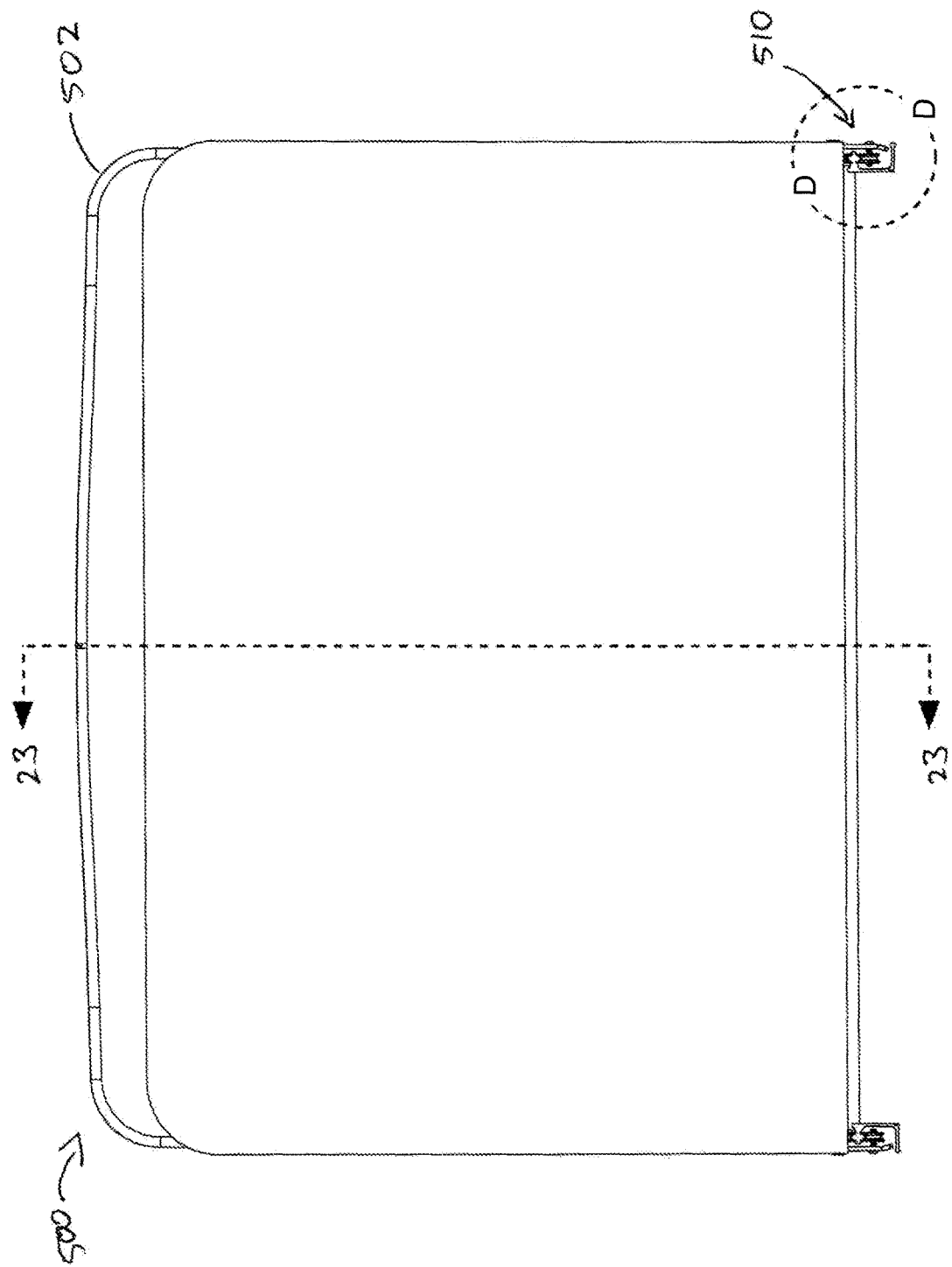
FIG. 21 a front elevational view of the bow lift assembly according to FIG. 20.
Figure 22:
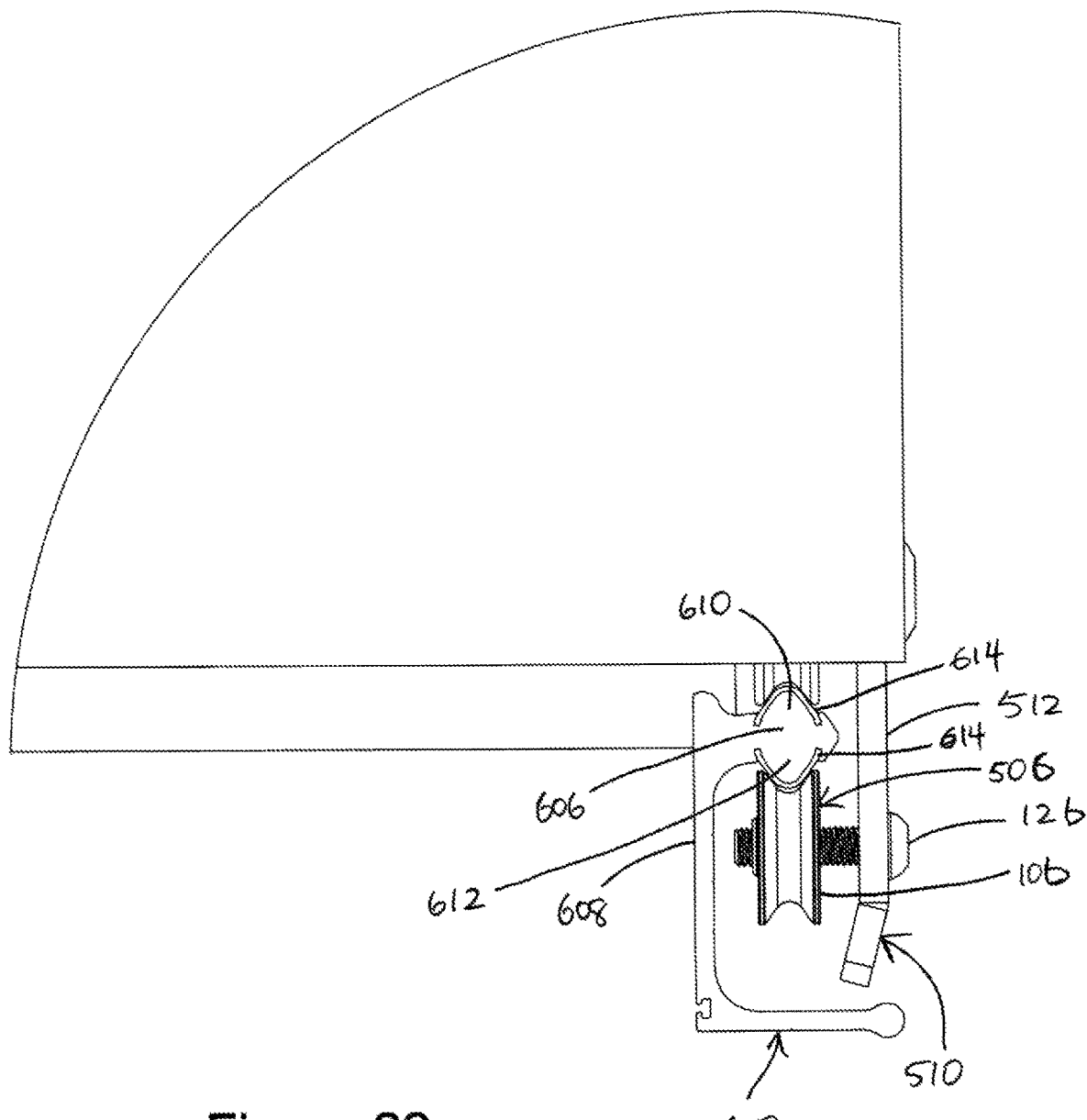
FIG. 22 is an enlarged view of portion D of FIG. 21.
Figure 23:
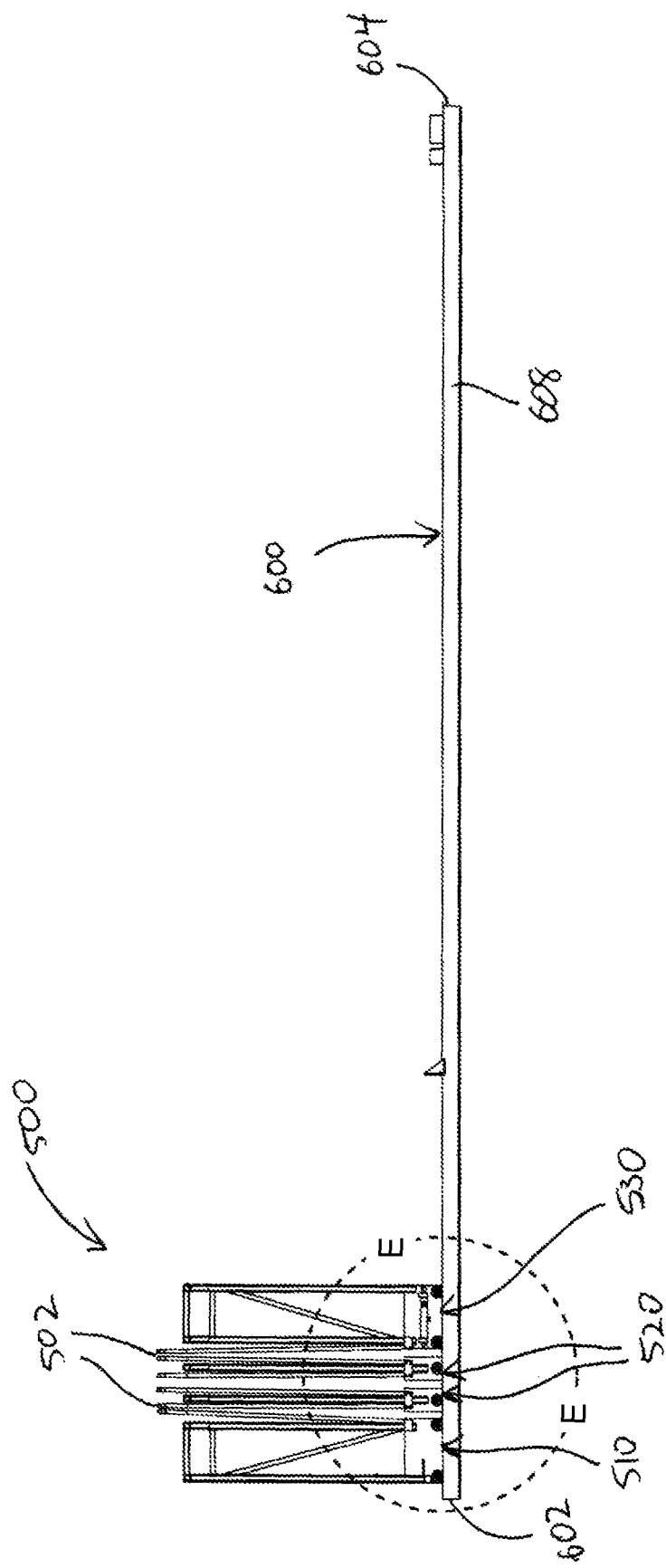
FIG. 23 is a cross-sectional view along line 23-23 of FIG. 21.

Referring to FIGS. 13 to 15, there is the wheel 10 in use in a second wheel assembly 200. Second wheel assembly 200 includes wheel 10 as described above, bearing 102, a spacer 202, a bolt 204, and a nut 206.

As noted before, bearing 102 is concentrically situated within central cavity 18 of cylindrical body 12, and is often used with a bearing clip 108.

Spacer 202, as shown, is positioned proximate to second face 16 of wheel 10, and is depicted as a square insert 208. As understood by the those skilled in the art, spacer 202 may have a different geometric shape.

Bolt 204 has a bolt head 210 and a bolt shank 212 threaded through spacer 202, second opening 24 of wheel 10, and bearing 102 to a distal end 214. In this manner, bolt head 210 is positioned proximate second face 16 of wheel 10. Nut 206 is a low profile secured to distal end 214 of bolt 204 to secure bolt 204 in place within cylindrical body 12 and bearing 102.

Distal end 214 of bolt 204 may terminate proximate first face 14 of wheel 10. In the depicted embodiment, distal end 214 of bolt 204 terminates outside central cavity 18 of cylindrical body 12 such that nut 206 partially extends past first face 14.

Referring to FIGS. 16 to 19, there is shown second wheel assembly 200 in use in a second car plate assembly 250. Second car plate assembly 250 includes a second car plate 252, and second wheel assembly 200 as described above.

In the depicted embodiment, second car plate 252 is different from first car plate 152, and has a wheel aperture, shown as a square aperture 254. Second wheel assembly 200 is positioned relative to second car plate 252 such that second face 16 is orientated facing second car plate 252.

To secure second wheel assembly 200 to second car plate 252, bolt shank 212 of bolt 204 is situated through square aperture 254, through square insert 208, and through bearing 102 of second wheel assembly 200. As discussed above, bolt 204 has a distal end 214, which terminates proximate to first face 14 of wheel 10, and to which nut 206 may be releasably secured.

In this manner, spacer 202 is situated between second car plate 252 and second face 16 of wheel 10.

In either case, the smaller second opening 24 allows bearing 102 to be more enclosed, than if second opening 24 were the same size as first opening 22. This may aid in providing greater weather protection. In second wheel assembly 200, smaller second opening 24 allows for spacer 202 to be inserted. When flipped, the same wheel 10 may be used in first wheel assembly 100 without the need for a different wheel.

As described above, wheel 10 may be used in at least two different assemblies with a bearing with at least two different car plates depending on whether the first face or the second face is positioned facing the car plate.

When first face 14 is orientated facing the car plate, wheel 10 may be secured to the car plate in first wheel assembly 100. When second face 16 is orientated facing the car plate, wheel 10 may be secured to the car plate in second wheel assembly 200. Thus, the same wheel 10 may be used with two or more different car plates, in various car plate assemblies as part of a tarpaulin system.

Turning now to FIGS. 20 to 34, there is illustrated a bow lift assembly 500 (a tarpaulin system without the tarp) having various car plate assemblies 510, 520, 530, 540, 550, 560 in use with a set of tracks 600. Each track 600 has a front end 602 and a rear end 604 that would, in use, be respectively situated proximate the front and the rear of a flat bed 700.

Bow lift assembly 500 is depicted as having a plurality of arches or bows 502 arranged in a retracted configuration at front end 602 of tracks 600. Arches 502 are depicted in the figures as having flat tops. In alternate applications, the roof of the arches may have a different geometry, such as round tops. The end of each arch 502 is secured to one of the car plate assemblies. Each car plate assembly is typically secured to one or two arches 502. In alternate applications, three or more arches may be secured to a car plate assembly.

A tarp (not shown) may be removably affixed to each of the arches 502. A flat bed can be covered by sliding the car plates back towards rear end 604 of tracks 600, pulling the other car assemblies along with it. Alternately, if the bow lift assembly is retracted at rear end 604 of tracks 600, the car plate assemblies may slide forward towards front end 602.

Each car plate assembly in bow lift assembly 500 generally includes a car plate with a first wheel aperture and a second wheel aperture positioned below, and spaced apart from, the first wheel aperture. Bow lift assembly 500 further includes at least one upper roller 504, an axle for securing upper roller 504 to the car plate, at least one lower roller 506, and another axle for rotationally securing lower roller 506 to the car plate. Lower roller 506 is positioned below, and spaced apart from, upper roller 504 on the car plate such that track 600 may be operatively situated therebetween. In this manner, upper roller 504 and lower roller 506 may collectively engage with track 600 simultaneously from above and from below.

When bow lift assembly 500 has more than one upper roller 504, upper rollers 504 are positioned level, or in-line, with one another. When bow lift assembly 500 has more than one lower roller 506, lower rollers 506 are positioned in-line with one another below, or on a lower level than, upper rollers 504.

Upper and lower rollers 504, 506 may be wheels 10 as described above. In that regard, upper roller 504 may be a first wheel 10a with a bearing concentrically situated within its central cavity. A first axle 12a is situated through the first wheel aperture and the bearing of first wheel 10a to rotationally secure first wheel 10a to the car plate. First axle 12a may comprise similar components as found in second wheel assembly 200, described above, such as a spacer 202, a bolt 204, and a nut 206.

Lower roller 506 may also be a second wheel 10b with another bearing concentrically situated within its central cavity. A second axle 12b is situated through the second wheel aperture and the bearing of second wheel 10b to rotationally secure second wheel 10b to the car plate below first wheel 10a. Second axle 12b may comprise similar components as found in first wheel assembly 100, described above, such as a hub 104 and a locking ring 106.

FIGS. 20 to 29 and 34 illustrate embodiments of bow lift assembly 500. The car plate assembly closest to front end 602 is referred to as front car plate assembly 510, and the car plate assembly positioned furthest from front end 602 is referred to as rear car plate assembly 530. The car plate assemblies situated therebetween are referred to as intermediate car plate assemblies 520. In the depicted embodiment, front and rear car plate assemblies 510, 530 are each secured to two arches 502. Intermediate car plate assemblies 520 are each secured to one arch 502. In alternate applications, front, intermediate and rear car plate assemblies 510, 520, 530 may be secured to a different number of arches 502.

Figure 24:
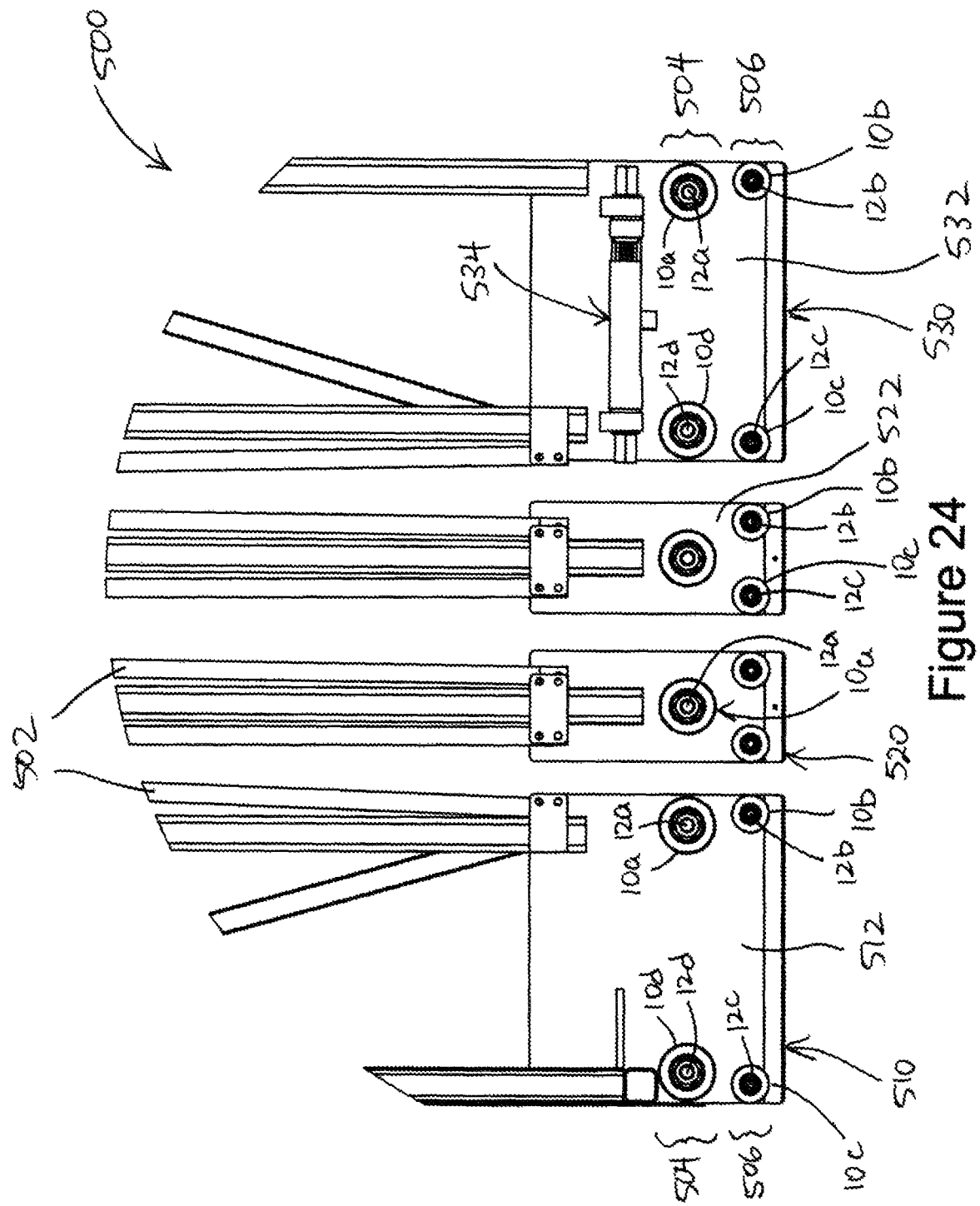
FIG. 24 is an enlarged view of portion E of FIG. 23.
Figure 25:
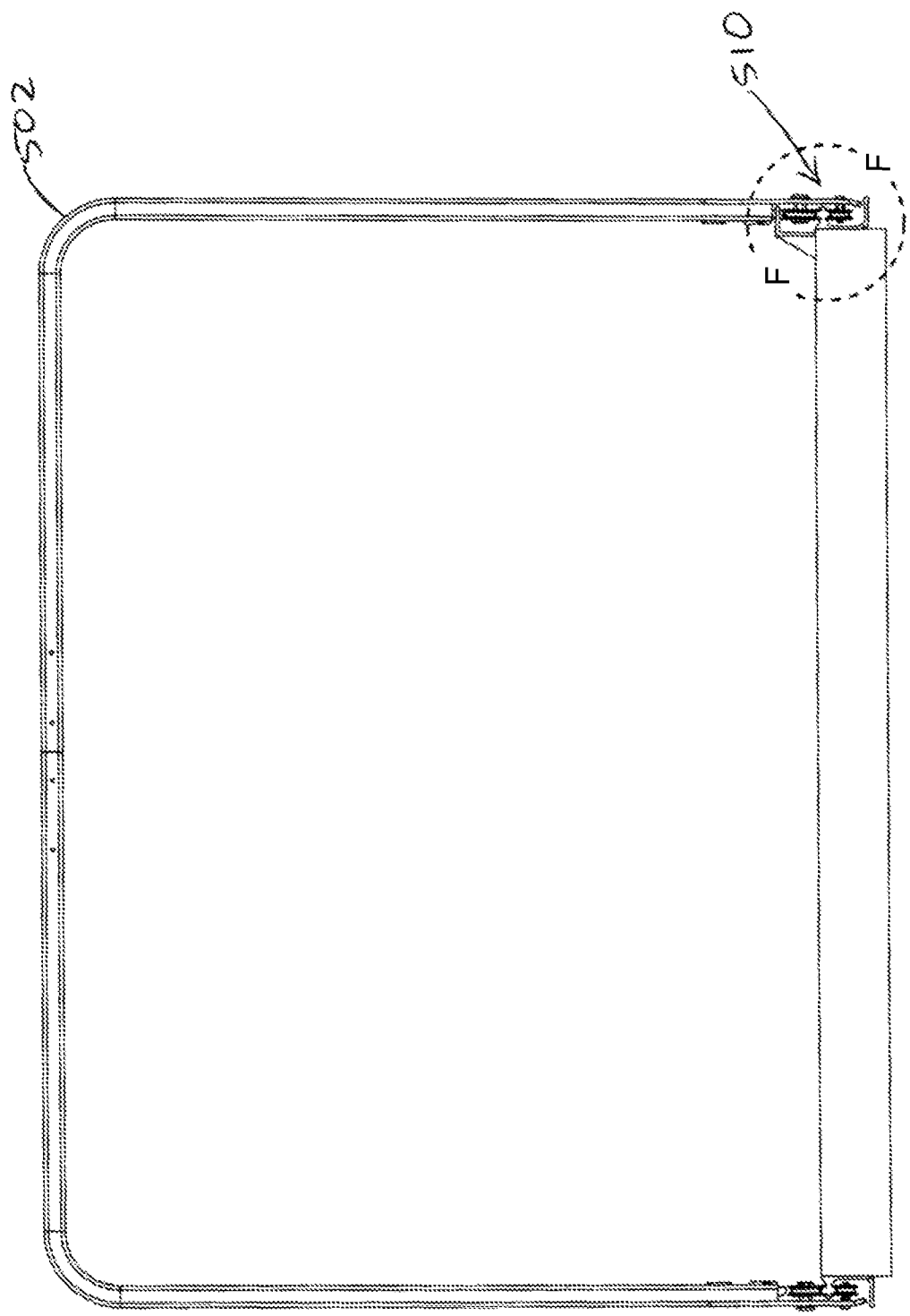
FIG. 25 is a cross-sectional view along line 25-25 of FIG. 20.

Front, intermediate and rear car plate assemblies 510, 520, 530 of this embodiment may be best seen in FIG. 24.

Intermediate car plate assembly 520 has an intermediate car plate 522 with first, second, and third wheel apertures that are spaced apart from one another. As described above, first wheel 10a is rotationally secured to intermediate car plate 522 through the first wheel aperture as an upper roller 504. Second wheel 10b is rotationally secured to intermediate car plate 522 through the second wheel aperture as a lower roller 506.

In addition to the above, intermediate car plate assembly 520 further includes a third wheel 10c and a third axle 12c. Third wheel 10c has a bearing concentrically situated within its central cavity and third axle 12c is situated through the third wheel aperture and the bearing of third wheel 10c to rotationally secure third wheel 10c to intermediate car plate 522. Third axle 12c may comprise similar components as found in first wheel assembly 100, described above, such as a hub 104 and a locking ring 106.

In the depicted embodiment, third wheel 10c is positioned below first wheel 10a as another lower roller 506. In this manner, first, second, and third wheels 10a, 10b, 10c are arranged in a triangle configuration on intermediate car plate 522. In alternate examples, first, second, and third wheels 10a, 10b, 10c may be arranged in a more asymmetric configuration.

In this shown embodiment, the number of lower rollers 506 secured to intermediate car plate 522 is greater than the number of upper rollers 504. However, alternately, the number of lower rollers 506 secured to the car plate may be less than the number of upper rollers 504. For example, third wheel 10c may instead be positioned above second wheel 10b as an upper roller 504 rather than a lower roller 506. It may also be possible to use a configuration with two upper rollers 504 and two lower rollers 506 on the intermediate car plate 522.

Front car plate assembly 510 has a front car plate 512 with first, second, third, and fourth wheel apertures that are spaced apart from one another. First wheel 10a is rotationally secured to front car plate 512 through the first wheel aperture as an upper roller 504. Second wheel 10b is rotationally secured to front car plate 512 through the second wheel aperture as a lower roller 506. Third wheel 10c is rotationally secured to front car plate 512 through the third wheel aperture as a lower roller 506.

Front car plate assembly 510 includes a fourth wheel 10d and a fourth axle 12d. Fourth wheel 10d has a bearing concentrically situated within its central cavity and fourth axle 12d is situated through the fourth wheel aperture and the bearing of fourth wheel 10d to rotationally secure fourth wheel 10d to front car plate 512. Fourth axle 12c may comprise similar components as found in second wheel assembly 200, described above, such as a spacer 202, a bolt 204, and a nut 206.

While first, second, third, and fourth axles 12a, 12b, 12c, 12d have been described to include components similar to those in first or second wheel assemblies 100, 200, other components may be used to rotationally secure the wheels to the car plates as known in the art.

In the depicted embodiment, third wheel 10c is positioned below first wheel 10a as another lower roller 506, and fourth wheel 10d is positioned above third wheel 10c as another upper roller 504. In this manner, first, second, third, fourth wheels 10a, 10b, 10c, 10d are arranged in a trapezoid configuration on front car plate 512. In alternate examples, first, second, third, and fourth wheels 10a, 10b, 10c, 10d may be arranged in a rectangular, or a more asymmetric, configuration.

In the shown embodiment, the number of lower rollers 506 secured to front car plate 512 is the same as the number of upper rollers 504. However, alternately, the number of lower rollers 506 may be greater than or less than the number of upper rollers 504 secured to front car plate 512.

For example, fourth wheel 10d may instead be positioned below first wheel 10a as another lower roller 506 rather than an upper roller 504, such that front car plate assembly 510 has three lower rollers 506 and one upper roller 504. In a further example, third wheel 10c may instead be positioned above second wheel 10b as another upper roller 504, such that front car plate assembly 510 has three upper rollers 504 and one lower roller 506.

Similar to front car plate assembly 510, rear car plate assembly 530 has a rear car plate 532 with first, second, third, and fourth wheel apertures that are spaced apart from one another. First, second, third and fourth wheels 10a, 10b, 10c, 10d are rotationally secured to rear car plate 512, respectively, through the first, second, third, and fourth wheel apertures as described above.

Unlike front car plate assembly 510, rear car plate assembly 530 further includes a locking mechanism 534 for holding bow lift assembly 500 in place relative to track 600 when bow lift assembly 500 is in its extended configuration.

As depicted in FIGS. 20 to 29, each of front, intermediate and rear car plate assemblies 510, 520, 530, the diameter of upper rollers 504 are different than that of lower rollers 506. In particular, the diameters of first and fourth wheels 10a, 10d are larger than the diameters of second and third wheels 10b, 10c. Upper rollers 504 with larger diameters than that of lower rollers 506 may be useful with larger applications, such as semi-trailers with rolling tarps.

In an alternate embodiment, the diameter of upper rollers 504 may be the same or smaller than that of lower rollers 506.

As also depicted, in front, intermediate and rear car plate assemblies 510, 520, 530, upper rollers 504 are vertically offset from lower rollers 506. In particular, first and fourth wheels 10a, 10d are vertically offset from second and third wheels 10b, 10c. In an alternate embodiment, upper rollers 504 may be positioned directly above, or be vertically aligned with, lower rollers 506.

While intermediate car plate assembly 520 is illustrated with three wheels, and front and rear car plate assemblies 510, 530 are illustrated with four wheels each, the car plate assemblies may have a different number of wheels. For example, the car plate assemblies may have two wheels, five wheels, or more than five wheels, so long as there is at least one upper roller 504 and one lower roller 506.

Bow lift assembly 500 may be used with a number of different tracks. In particular, the track would have a rolling portion 606 that would, in use, be positioned between upper rollers 504 and lower rollers 506 to simultaneously engage both upper rollers 504 and lower rollers 506. In that regard rolling portion 606 would be a double edged track.

When upper and lower rollers 504, 506 are wheels 10 as described above, rolling portions 606 of track 600 is configured to simultaneously engage groove 13 of cylindrical bodies 12 of first, second, third, and fourth wheels 10a, 10b, 10c, 10d, as applicable.

Figure 26:
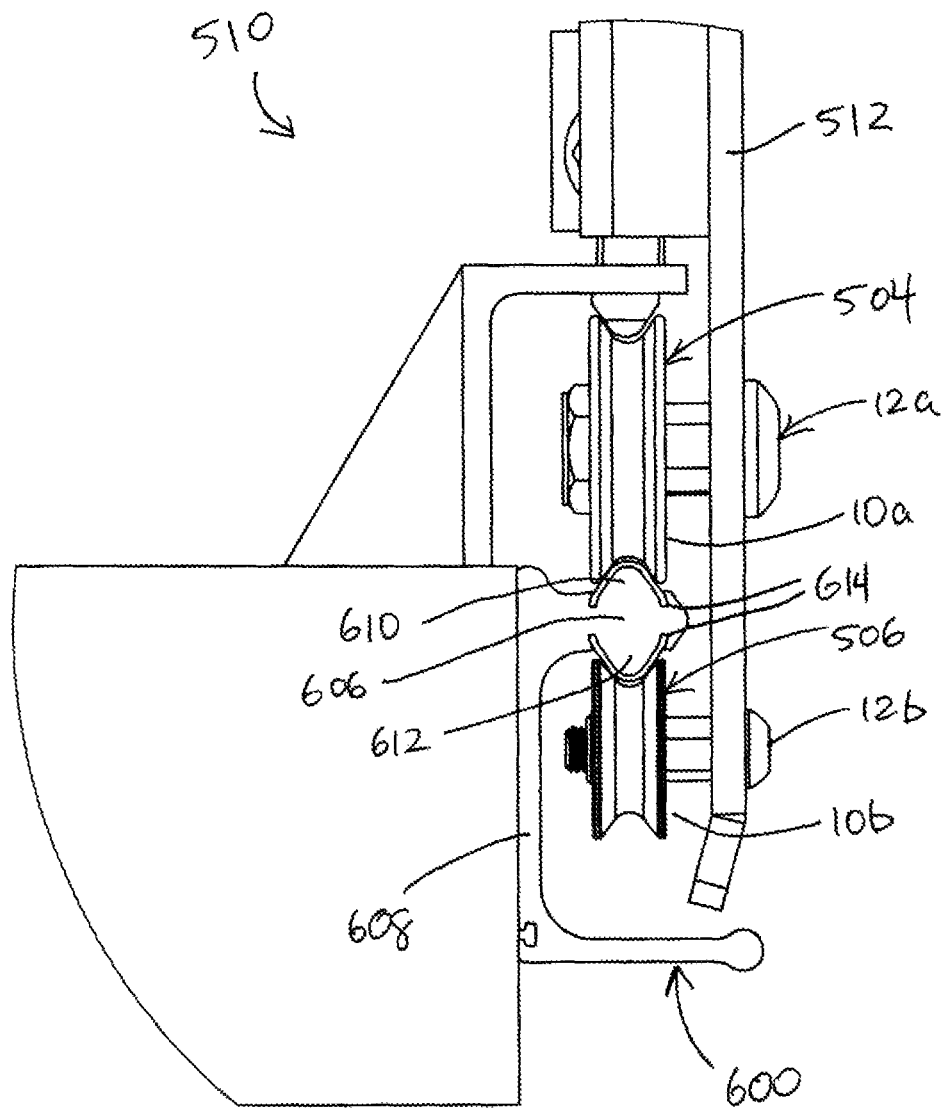
FIG. 26 is an enlarged view of portion F of FIG. 25.
Figure 27:
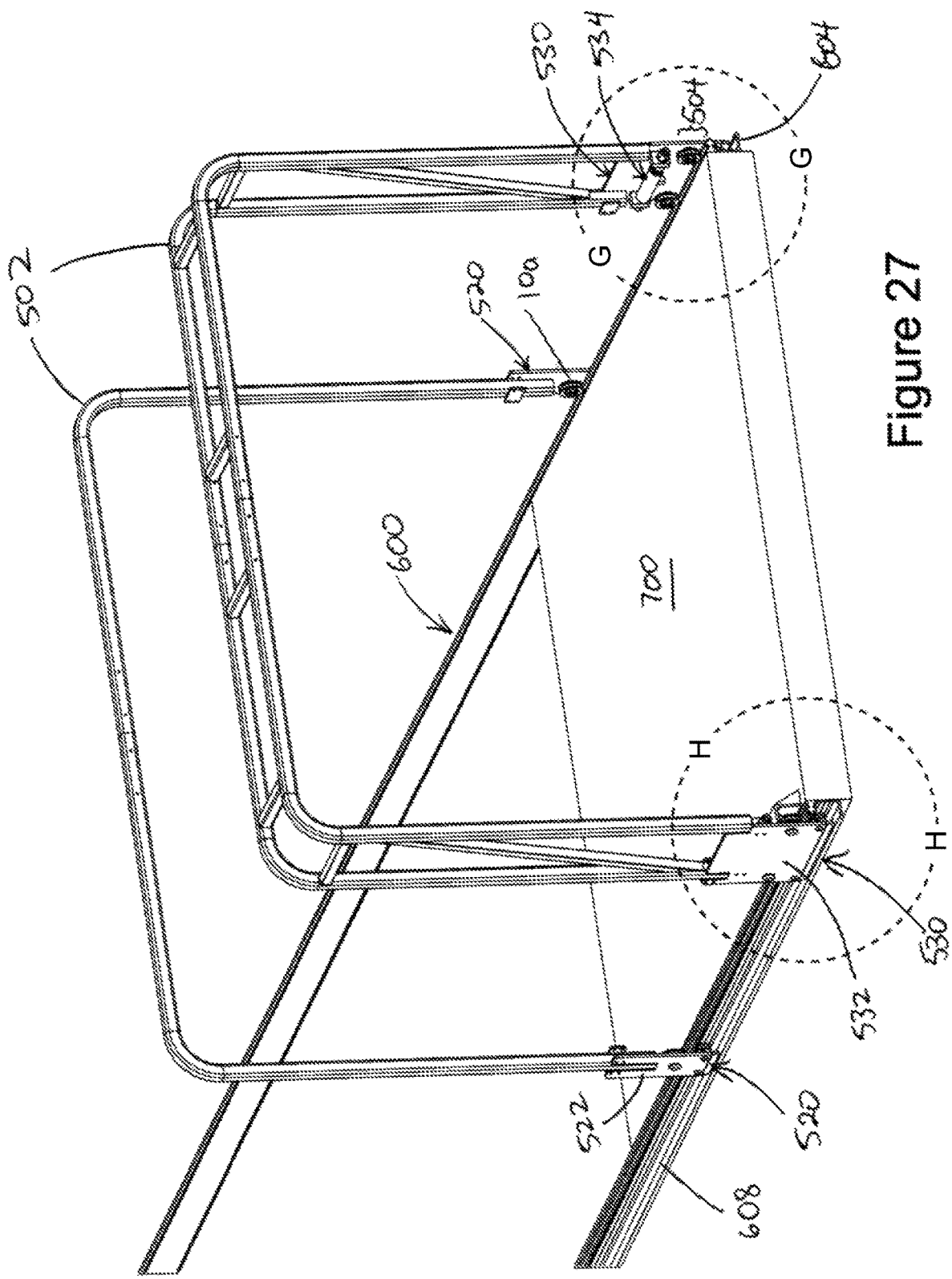
FIG. 27 is a partial rear perspective view of FIG. 20 with the bow lift assembly in an expanded configuration with a part of a flat bed.
Figure 28:
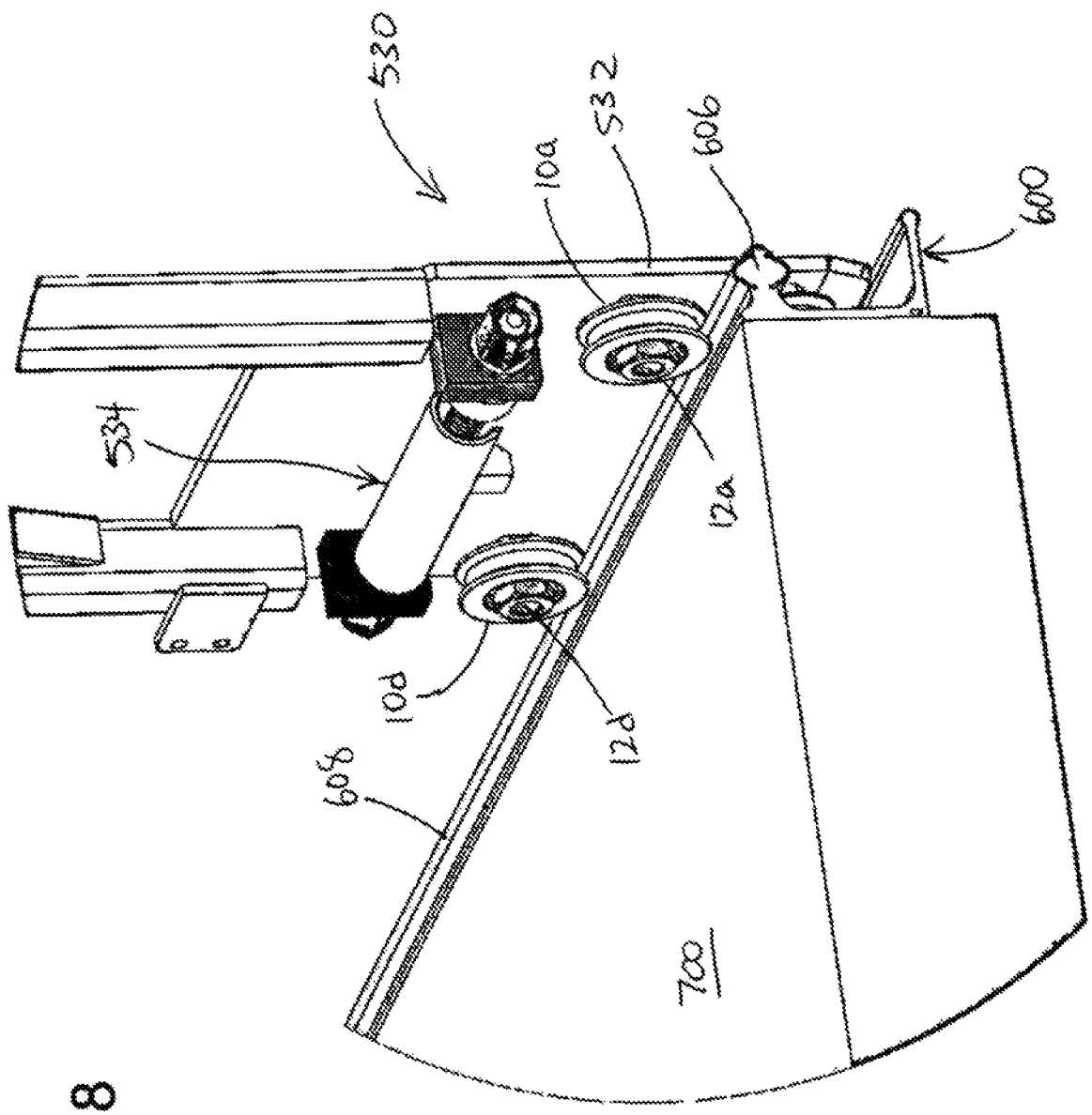
FIG. 28 is an enlarged view of portion G of FIG. 27.
Figure 29:
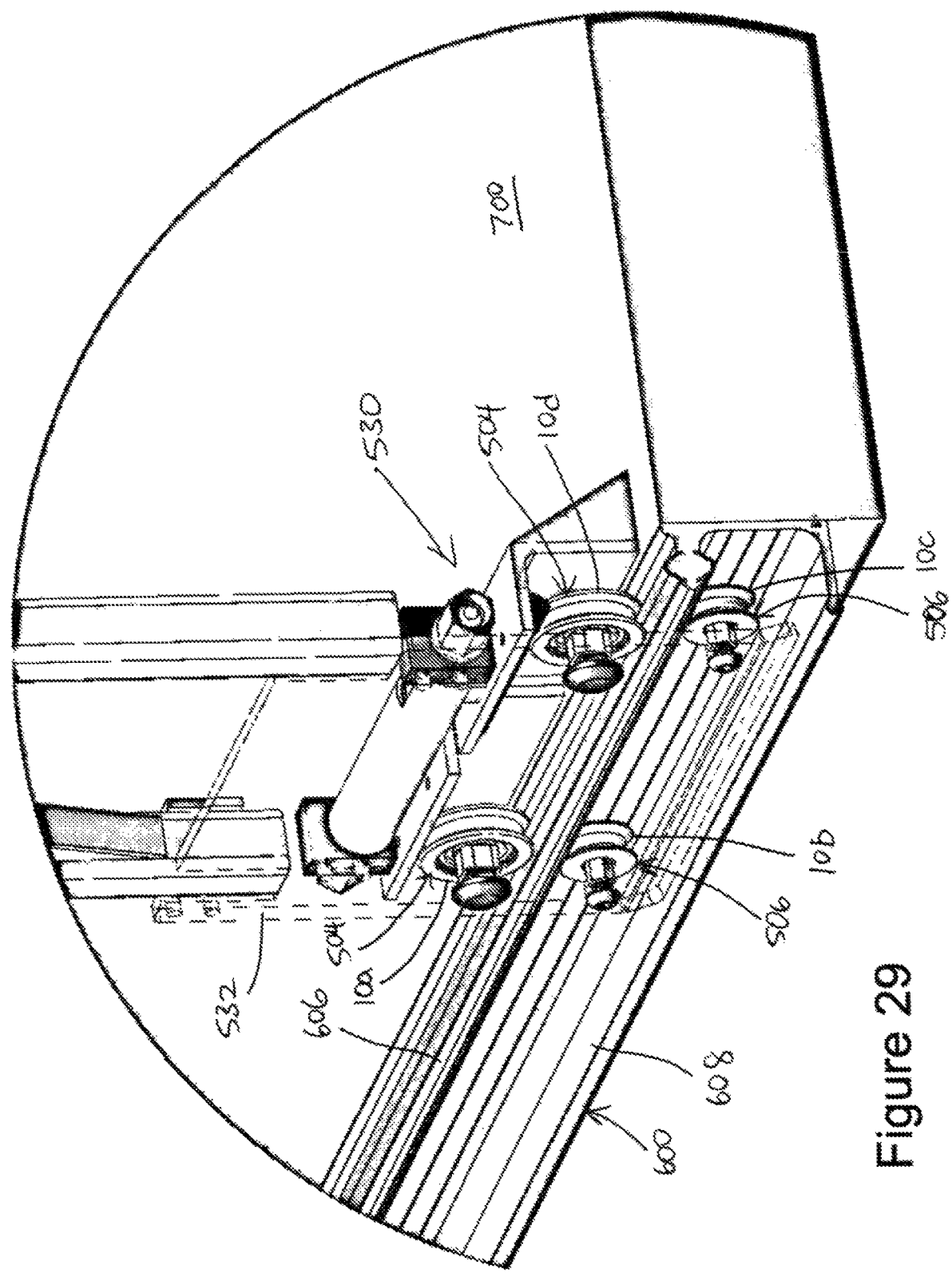
FIG. 29 is an enlarged view of portion H of FIG. 27 with a transparent car plate.

In such an application, rolling portions 606 may have a rounded, diamond-shaped cross-section, which may be referred to as a diamond track 608. As best seen in FIG. 26, rolling portion 606 of each diamond track 608 has an upper ridge 610 projecting upwardly to engage with upper rollers 504, such as first and fourth wheels 10a, 10d. Rolling portion 606 further has a lower ridge 612 projecting downwardly to engage with lower rollers 506, such as second and third wheels 10b, 10c. Upper and lower ridges 610, 612 are rounded and dimensioned to correspond with groove 13 of cylindrical bodies 12 of first, second, third, and fourth wheels 10a, 10b, 10c, 10d.

The depicted embodiment of diamond track 608 further includes a friction reducing layer, such as stainless steel inserts 614, covering both ridges of rolling portion 606.

Figure 34:
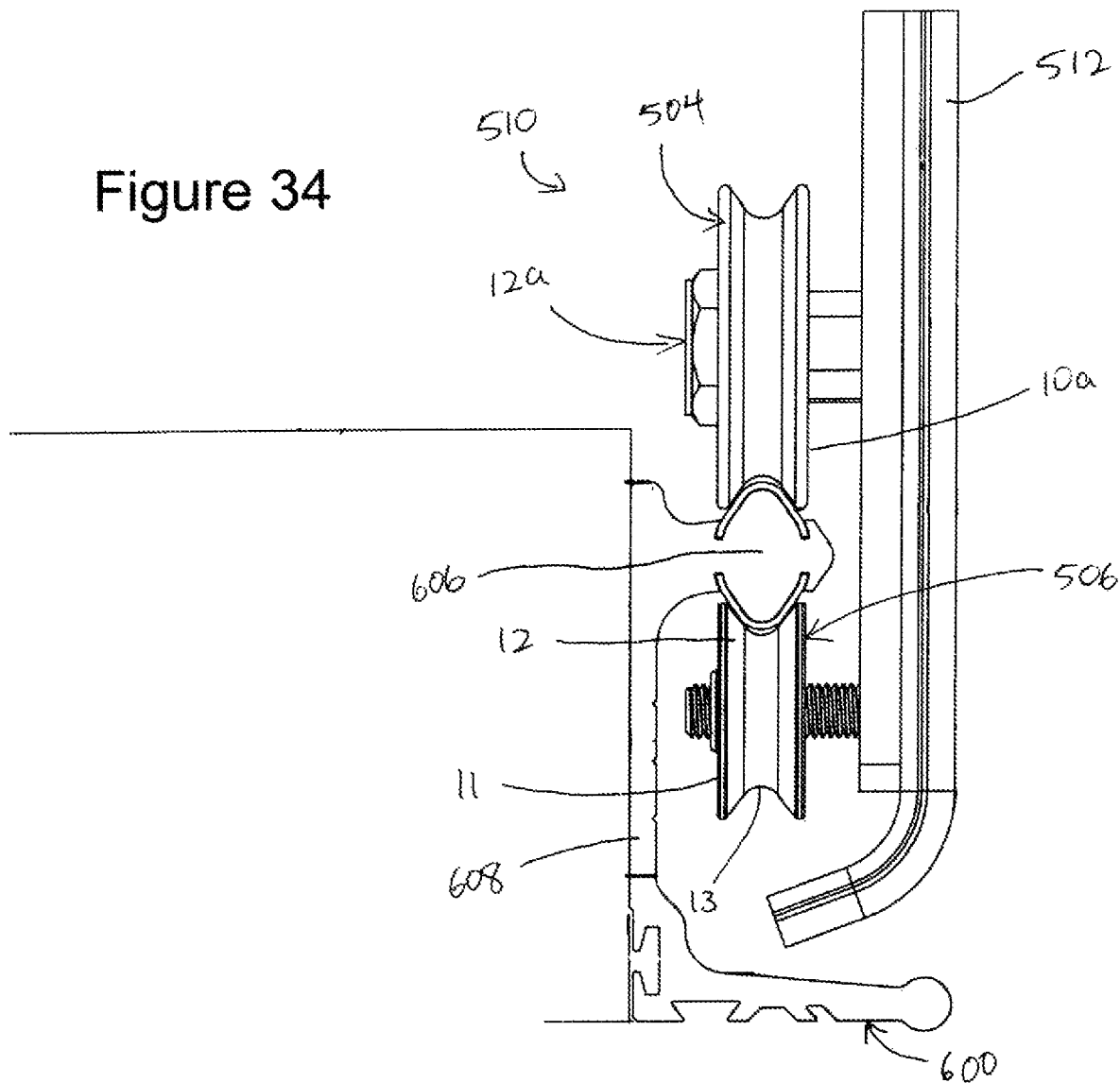
FIG. 34 is a view of an alternate configuration of the portion of FIG. 26.

While the above upper and lower rollers 504, 506 are wheels 10, in an alternate embodiment, lower rollers 506 may be a wheel 11 that is different from wheels 10. While different wheel 11 may not have the opposed asymmetrically sized openings as wheel 10, as shown in FIG. 34, different wheel 11 is rotationally secure to the car plate below first wheel 10a and also has a smaller diameter than upper roller 504/first wheel 10a. As shown, different wheel 11 also has groove 13 in cylindrical bodies 12 in order to engage with diamond track 608. Alternately, wheel 11 may have the same or a larger diameter than upper roller 504/first wheel 10a.

FIGS. 30 to 33 illustrate other embodiments of car plate assemblies that may be used in bow lift assembly 500. As discussed above regarding front, intermediate and rear car plate assemblies 510, 520, 530, the diameter of upper rollers 504 are different than that of lower rollers 506, and upper rollers 504 are vertically offset from lower rollers 506.

Figure 30:
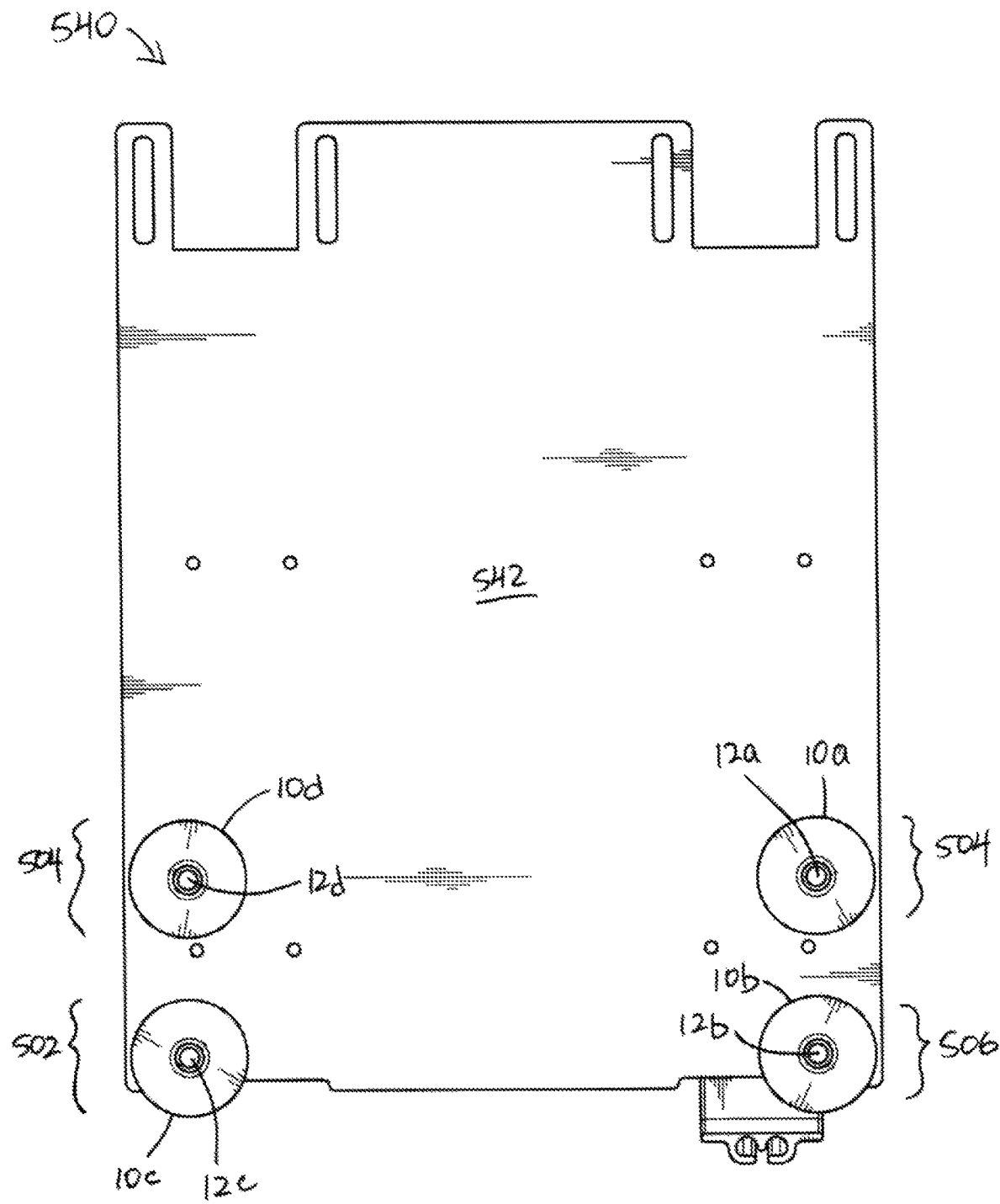
FIG. 30 is a back elevational view of a car plate assembly with four wheels of FIG. 1 according another embodiment of the present invention.

In FIG. 30, there is illustrated an alternate front car plate assembly 540. Similar to front car plate assembly 510, alternate front car plate assembly 540 has an alternate front car plate 542 with first, second, third, and fourth wheel apertures, and has corresponding wheels 10a, 10b, 10c, 10d that are rotationally secured to alternate front car plate 542 in two rows as upper and lower rollers 504, 506.

Unlike front car plate assembly 510, however, upper and lower rollers 504, 506 of alternate front car plate assembly 540 have the same diameter, and are arranged in a rectangular configuration. In other words, first wheel 10a is vertically aligned with, or positioned directly above, second wheel 10b, while fourth wheel 10d is vertically aligned with, or positioned directly above, third wheel 10c.

Figure 31:
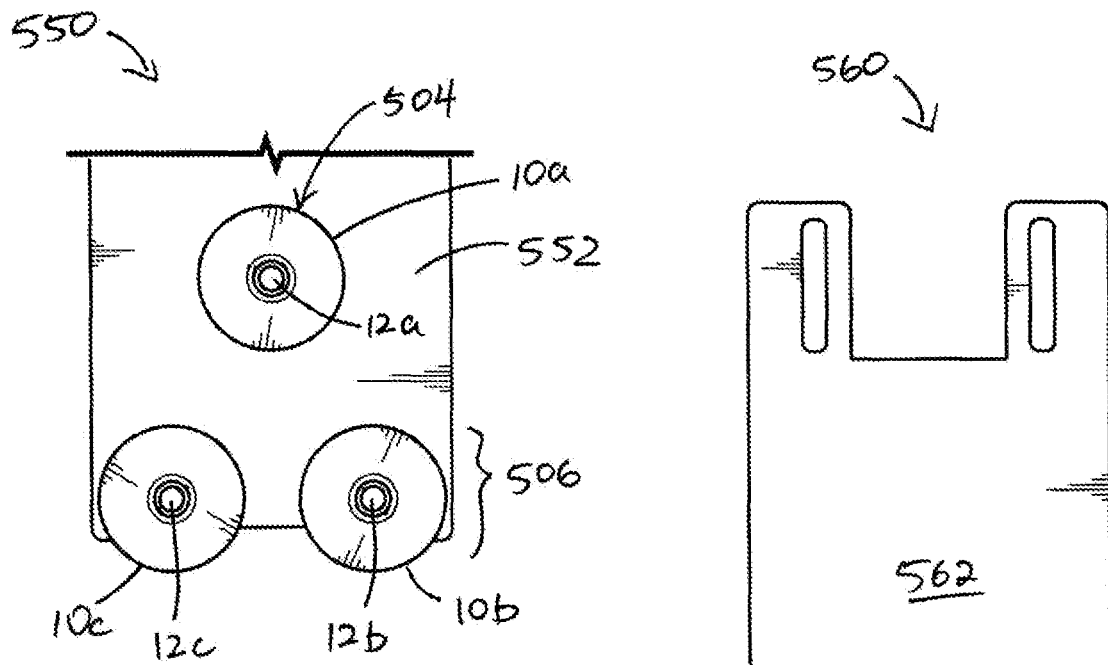
FIG. 31 is a partial back elevational view of a car plate assembly with three wheels of FIG. 1 according to a further embodiment of the present invention.

In FIG. 31, there is illustrated an alternate intermediate car plate assembly 550. Similar to intermediate car plate assembly 520, alternate intermediate car plate assembly 550 has an alternate intermediate car plate 552 with first, second, and third wheel apertures, and has corresponding wheels 10a, 10b, 10c that are rotationally secured to alternate intermediate car plate 552 as upper and lower rollers 504, 506 in a triangle configuration.

Unlike intermediate car plate assembly 520, however, upper and lower rollers 504, 506 of alternate intermediate car plate assembly 550 have the same diameter. Upper rollers 504 with the same diameters as that of lower rollers 506 may be useful with smaller applications, such as a rolling roof for a dump trailer.

Figure 32:
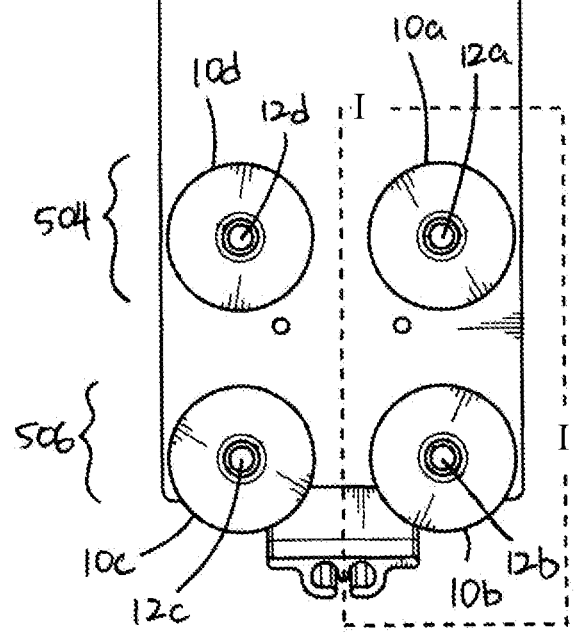
FIG. 32 is a back elevational view of a car plate assembly with four wheels of FIG. 1 according a still further embodiment of the present invention.

In FIG. 32, there is illustrated a further alternate intermediate car plate assembly 560 with further alternate intermediate car plate 562. Further alternate intermediate car plate assembly 560 has an additional fourth wheel aperture with an additional fourth wheel 10d that is rotationally secured to further alternate intermediate car plate 562. Similar to alternate front car plate assembly 540, upper and lower rollers 504, 506 of further alternate front car plate assembly 560 have the same diameter, and are arranged in a rectangular configuration.

Figure 33:
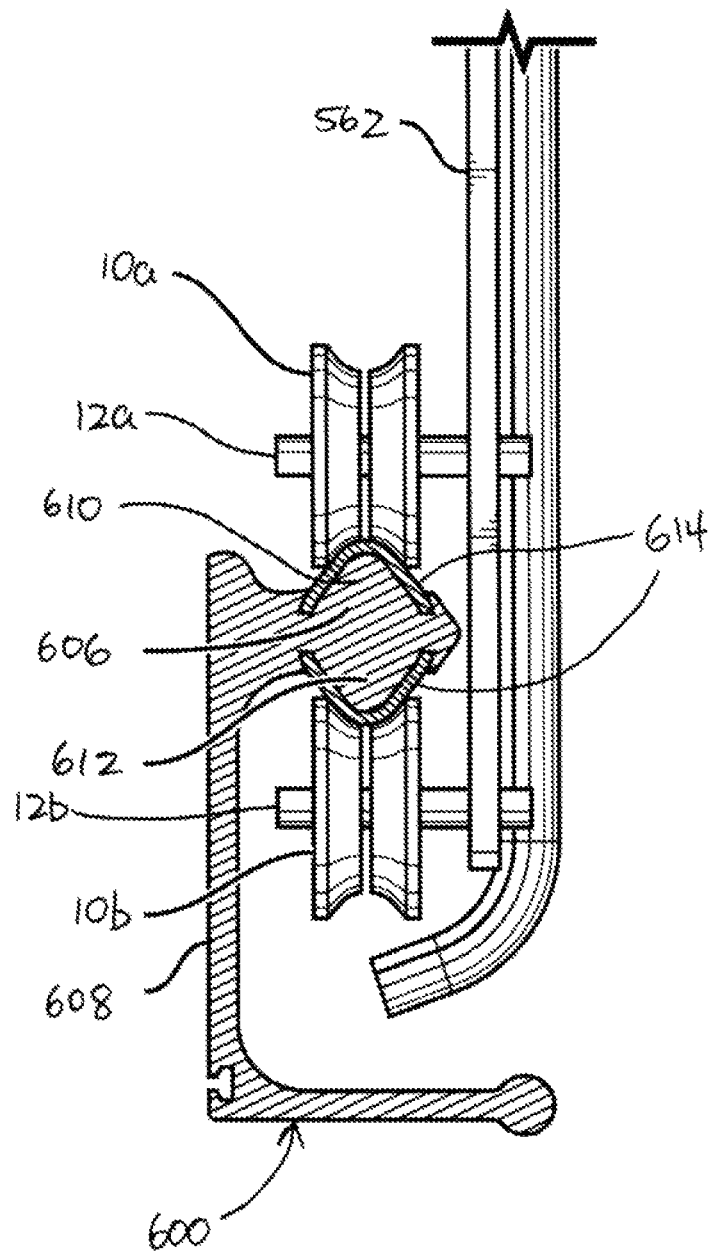
FIG. 33 is an enlarged side view of portion I of FIG. 32 in use with a track.

Car plate assemblies 540, 550, 560 may also be used with diamond track 608, as shown in FIG. 33.

In a similar manner, rolling portion 606 would, in use, be positioned between upper rollers 504 and lower rollers 506 of car plate assemblies 540, 550, 560 to simultaneously engage both upper rollers 504 and lower rollers 506. When upper and lower rollers 504, 506 are wheels 10 as described above, rolling portions 606 of track 600 is configured to simultaneously engage grooves 13 of cylindrical bodies 12 of first, second, third, and fourth wheels 10a, 10b, 10c, 10d, as applicable.

While three or four wheels are illustrated in car plate assemblies 540, 550, 560, in alternate applications, two, five or more wheels may be rotationally secured in the car plate assemblies for contact with track 600. The variations of car plate assemblies may be used with diamond track 608 so long as there is an upper roller 504 and a lower roller 506 positioned above and below each track.

One advantage of the present subject matter, is that the double contact of the rolling portion of the track with the upper and lower rollers tends to result in greater stability of the car plates when sliding relative to one another and relative to the flat bed.

The enhanced stability allows for car plates having smaller widths to be used in the bow lift/tarpaulin system. This is illustrated, for example, in FIGS. 24, 27, 31, and 32, where the various intermediate car plates are shown to have notably smaller widths than that of the front and rear car plates. Moreover, the double contact between the track and the upper and lower rollers helps to allow the widths of the present front and rear car plates to be generally smaller than those of conventional front and rear car plates in standard tarpaulin systems.

This reduction in widths of the car plates allows for a more compact condensation or accordion of the car plate assemblies in the bow lift assembly when the car plates are pushed together. Thus, the double contact of the upper and lower wheel surfaces in relationship to the track surface in a vertical upper and lower configuration allows for a narrower stance of the car plates.

For example, typical car plate assemblies in a bow lift assembly on a 48-foot trailer may be condensed or bunched together into a bundle that is about 9 feet wide. When the present bow lift, wheel and car plate assemblies are used on a 48-foot trailer, the car plate assemblies may be condensed or bunched together into a bundle that is about 6 feet wide. A more densely packed bow lift assembly of car plate assemblies allows for a denser accordion of the tarp to be formed when collapsed. This tends to result in a larger proportion of the trailer bed being exposed and more easily worked on, such as when an overhead crane is used for loading.

It will be apparent to those having ordinary skill in the art that certain adaptations and modifications of the described embodiments can be made, consistent with and without departing from the present invention. Unless otherwise indicated, the embodiments described in the invention shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein.

It also will be apparent to those of skill in the art that the present invention can be used with any form of sliding tarpaulin system comprising a tarpaulin affixed to a plurality of cars that slide along a track. For example, the present invention can be used with a curtain-style sliding tarpaulin system installed on a single surface of a covered trailer, in addition to systems that cover flatbed trailers such as the one described herein. Accordingly, the specification and the embodiments disclosed therein are to be considered exemplary only, with the true scope of the present invention being identified in the following claims.

I claim:

1. A wheel for use with a bearing and a car plate in a tarpaulin system, the wheel comprising:
a cylindrical body with a groove, a first face, and an opposed second face,
the first face having a first opening with a first diameter and the second face having a second opening with a second diameter that is smaller than the first diameter;
the cylindrical body further having a central cavity extending between the first opening and the second opening for receiving the bearing therein;
wherein the first face and the second face can be alternately positioned facing the car plate in different wheel assemblies.

2. The wheel of claim 1, wherein the ratio of the first diameter of the first opening to the second diameter of the second opening is between 4:3 to 5:3.

3. The wheel of claim 1, wherein the groove in the cylindrical body is rounded with a V-shaped cross-section.

4. The wheel of claim 3, wherein the groove in the cylindrical body spans an angle between 70 and 80 degrees.

5. A car plate assembly comprising:
a car plate with a wheel aperture;
the wheel assembly of claim 4, wherein the first face is orientated facing the car plate;
a pin situated through the wheel aperture and the hub of the wheel assembly;
wherein the hub head also acts as a spacer between the car plate and the first face of the wheel.

6. A car plate assembly comprising:
a car plate with a wheel aperture;
the wheel assembly of claim 5, wherein the second face is orientated facing the car plate;
the bolt shank being situated through the wheel aperture, the spacer, and the bearing of the wheel assembly;
wherein the spacer is situated between the car plate and the second face of the wheel.

7. A wheel assembly comprising:
the wheel of claim 1;
a bearing concentrically situated within the central cavity of the cylindrical body;
a hub with a hub head and a hub shank concentrically positioned and situated through the first opening of the wheel and through the bearing, the hub head being positioned proximate the first face; and
a locking ring secured to a distal end of the hub to secure the hub in place within the cylindrical body and the bearing.

8. The wheel assembly of claim 7, further comprising a cover secured to the second face in covering relation over the second opening.

9. A wheel assembly comprising:
the wheel of claim 1;
a bearing concentrically situated within the central cavity of the cylindrical body;
a spacer positioned proximate the second face of the wheel;
a bolt with a bolt head and a bolt shank threaded through the spacer, the second opening of the wheel, and the bearing, wherein the bolt head is positioned proximate the second face; and
a nut secured to a distal end of the bolt to secure the bolt in place within the cylindrical body and the bearing.

10. A car plate assembly comprising:
a car plate with a first wheel aperture and a second wheel aperture positioned below, and spaced apart from, the first wheel aperture;
a first wheel of claim 1;
a first axle situated through the first wheel aperture and the first wheel to rotationally secure the first wheel to the car plate as an upper roller;
a second wheel; and
a second axle situated through the second wheel aperture and the second wheel to rotationally secure the second wheel to the car plate below the first wheel as a lower roller;
the upper and lower rollers spaced apart to operatively receive a track therebetween.

11. A car plate assembly comprising:
a car plate with a first wheel aperture and a second wheel aperture positioned below, and spaced apart from, the first wheel aperture;
a first wheel of claim 1;
a first axle situated through the first wheel aperture and the first wheel to rotationally secure the first wheel to the car plate as an upper roller;
a second wheel of claim 1; and
a second axle situated through the second wheel aperture and the second wheel to rotationally secure the second wheel to the car plate below the first wheel as a lower roller;
the upper and lower rollers spaced apart to operatively receive a track therebetween.

12. The car plate assembly of claim 11, wherein the diameter of the first wheel is larger than the diameter of the second wheel.

13. The car plate assembly of claim 11, wherein the first wheel is vertically offset from the second wheel on the car plate.

14. The car plate assembly of claim 11, wherein the car plate further has a third wheel aperture spaced apart from the first and second wheel apertures, the car plate assembly further comprising:
a third wheel of claim 1; and
a third axle situated through the third wheel aperture and the third wheel to rotationally secure the third wheel to the car plate.

15. The car plate assembly of claim 14, wherein the third wheel is positioned below the first wheel as another lower roller, the first, second, and third wheels being arranged in a triangle configuration on the car plate.

16. The car plate assembly of claim 14, wherein the car plate further has a fourth wheel aperture spaced apart from the first, second, and third wheel apertures, the car plate assembly further comprising:
a fourth wheel of claim 1; and
a fourth axle situated through the fourth wheel aperture and the fourth wheel to rotationally secure the fourth wheel to the car plate.

17. The car plate assembly of claim 16, wherein the third wheel is positioned below the first wheel as another lower roller and the fourth wheel is positioned above the third wheel as another upper roller, the first, second, third, and fourth wheels being arranged in a trapezoid configuration on the car plate.

18. The car plate assembly of claim 11, further comprising a track, the track having a rolling portion positioned between at least the first and second wheels to simultaneously engage the grooves of the cylindrical bodies of the first and second wheels.

19. The car plate assembly of claim 18, wherein the rolling portion of the track has an upper ridge projecting upwardly to engage with the first wheel, and a lower ridge projecting downwardly to engage with the second wheel.

20. The car plate assembly of claim 19, wherein the rolling portion of the track has a rounded, diamond-shaped cross-section.

* * * * *